US012527579B2

(12) United States Patent
Cundiff et al.

(10) Patent No.: US 12,527,579 B2
(45) Date of Patent: Jan. 20, 2026

(54) SURGICAL INSTRUMENTS, SYSTEMS, AND METHODS FOR PERFORMING AN OSTEOTOMY

(71) Applicant: Fusion Orthopedics USA, LLC, Mesa, AZ (US)

(72) Inventors: Adam J. Cundiff, Gilbert, AZ (US); Nathan G. Peterson, Gilbert, AZ (US); Eli W. Jacobson, Chandler, AZ (US)

(73) Assignee: Fusion Orthopedis USA, LLC, Mesa, AZ (US)

( * ) Notice: Subject to any disclaimer, the term of this patent is extended or adjusted under 35 U.S.C. 154(b) by 253 days.

(21) Appl. No.: 18/342,506

(22) Filed: Jun. 27, 2023

(65) Prior Publication Data
US 2025/0000521 A1    Jan. 2, 2025

(51) Int. Cl.
*A61B 17/14*    (2006.01)
*A61B 17/00*    (2006.01)
(Continued)

(52) U.S. Cl.
CPC .......... *A61B 17/144* (2016.11); *A61B 17/151* (2013.01); *A61B 17/8095* (2013.01);
(Continued)

(58) Field of Classification Search
CPC ........... A61B 17/1659; A61B 17/1671; A61B 17/1662; A61B 17/1757; A61B 17/16; A61B 17/1604; A61B 17/1657; A61B 17/1697; A61B 17/17; A61B 17/1739; A61B 17/14; A61B 17/142; A61B 17/144; A61B 17/151; A61B 17/8095; A61B 2017/564; A61B 2017/00477; B25D 3/00; B26B 3/00; B26B 3/04; B27B 11/00; B27B 11/02; B27B 21/00; Y10T 407/18; Y10T 83/9481
USPC .... 606/85, 82, 83, 84, 87, 79, 86, 171, 176, 606/177; 30/167, 168, 350, 166.3, 165, 30/370, 371, 173, 182, 223, 278, 27, 9.2, 30/299, 304, 346, 352, 351, 353, 355;
(Continued)

(56) References Cited

U.S. PATENT DOCUMENTS 2,216,788 A    10/1940  Ole
4,473,070 A *  9/1984  Matthews ............ A61B 17/164
                                              30/352
(Continued)

FOREIGN PATENT DOCUMENTS

CN    110799139 A  *  2/2020  ............. A61B 17/14

OTHER PUBLICATIONS

Extremity Medical, IO Freedom Lapidus Surgical Technique Featuring the Cartilaginator, 2022, p. 8.
(Continued)

*Primary Examiner* — Marcela I. Shirsat

(57) ABSTRACT

Surgical instruments, systems, and methods for performing an osteotomy are disclosed herein. A surgical system includes a body with a distal end, a proximal end, a first surface, and a second surface. The surgical system can include cutting blades positioned on the first surface and/or the second surface. The surgical system can include columns of cutting blades positioned on the first surface and/or the second surface. The surgical system can include rows of cutting blades positioned on the first surface and/or the second surface.

18 Claims, 18 Drawing Sheets

(51) Int. Cl.

| | | |
|---|---|---|
| | *A61B 17/15* | (2006.01) |
| | *A61B 17/16* | (2006.01) |
| | *A61B 17/17* | (2006.01) |
| | *A61B 17/56* | (2006.01) |
| | *A61B 17/80* | (2006.01) |
| | *B25D 3/00* | (2006.01) |
| | *B26B 3/00* | (2006.01) |
| | *B26B 3/04* | (2006.01) |
| | *B27B 11/00* | (2006.01) |
| | *B27B 21/00* | (2006.01) |

(52) U.S. Cl.
CPC ... *A61B 2017/00477* (2013.01); *A61B 17/142* (2016.11); *A61B 17/1604* (2013.01); *A61B 17/1657* (2013.01); *A61B 17/1659* (2013.01); *A61B 17/1662* (2013.01); *A61B 17/1671* (2013.01); *A61B 17/1697* (2013.01); *A61B 17/1739* (2013.01); *A61B 17/1757* (2013.01); *A61B 2017/564* (2013.01); *B25D 3/00* (2013.01); *B26B 3/00* (2013.01); *B26B 3/04* (2013.01); *B27B 11/00* (2013.01); *B27B 21/00* (2013.01); *Y10T 83/9481* (2015.04); *Y10T 407/18* (2015.01)

(58) Field of Classification Search
USPC ......... 83/523, 613, 821, 835, 846, 848, 849, 83/850, 853, 854, 697; 407/29.1, 18, 19, 407/29.12, 42, 103
See application file for complete search history.

(56) References Cited

U.S. PATENT DOCUMENTS

| | | |
|---|---|---|
| 4,872,452 A | 10/1989 | Alexon |
| 5,087,261 A | 2/1992 | Ryd |
| 5,147,364 A | 9/1992 | Comparetto |
| 6,083,228 A | 7/2000 | Michelson |
| 6,120,508 A | 9/2000 | Grunig |
| 6,468,080 B1 | 10/2002 | Fischer |
| 8,939,981 B1 | 1/2015 | Anderson |
| 8,969,981 B2 | 3/2015 | Kanai |
| 9,241,730 B2 | 1/2016 | Babaev |
| 11,058,550 B2 | 7/2021 | LaNeve |
| 11,253,272 B2 | 2/2022 | Cundiff |
| 11,253,273 B2 | 2/2022 | Cundiff |
| 11,376,017 B2 | 7/2022 | Cundiff |
| 2004/0215197 A1 | 10/2004 | Smith |
| 2005/0080422 A1 | 4/2005 | Otte |
| 2007/0010822 A1 | 1/2007 | Zalenski |
| 2007/0233131 A1 | 10/2007 | Song |
| 2010/0121153 A1 | 5/2010 | To |
| 2010/0145343 A1 | 6/2010 | Johnson |
| 2011/0071527 A1 | 3/2011 | Nelson |
| 2013/0304070 A1 | 11/2013 | Nelson |
| 2018/0132867 A1* | 5/2018 | Dees ................. A61B 17/1659 |
| 2019/0183521 A1 | 6/2019 | Li |
| 2019/0314040 A1 | 10/2019 | Greenhalgh |
| 2021/0071432 A1 | 3/2021 | Bordin |
| 2023/0233214 A1 | 7/2023 | Cundiff |

OTHER PUBLICATIONS

CrossRoads Extremity Systems, dynaBunion 4D Minimal-Incision Lapidus System Surgical Technique, pp. 10, 12.

* cited by examiner

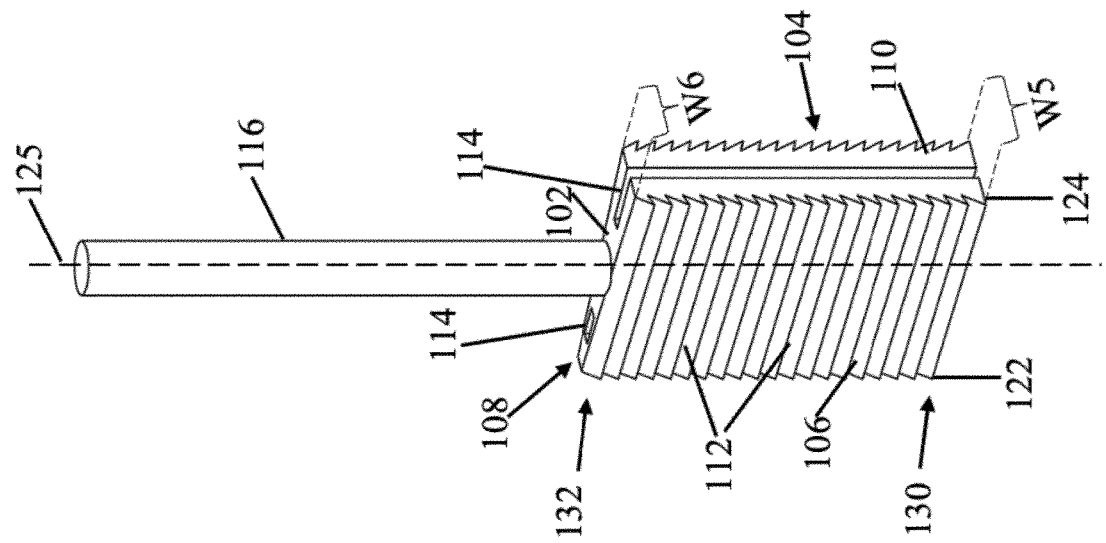
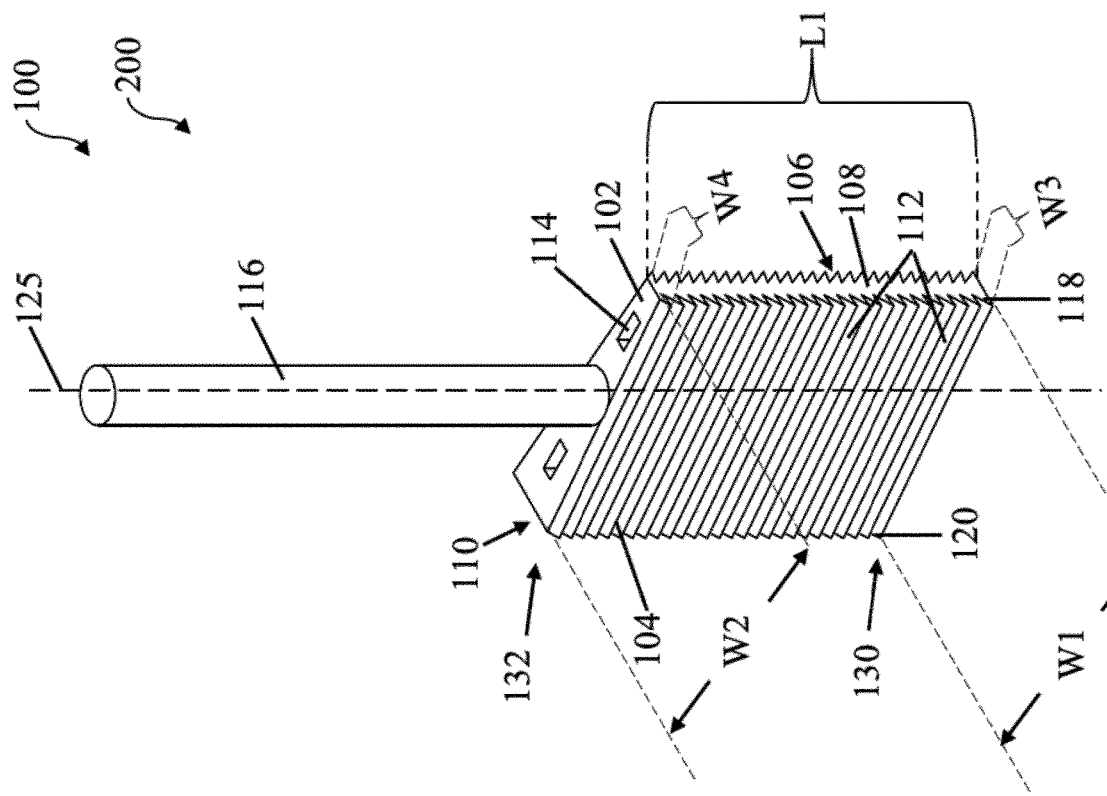

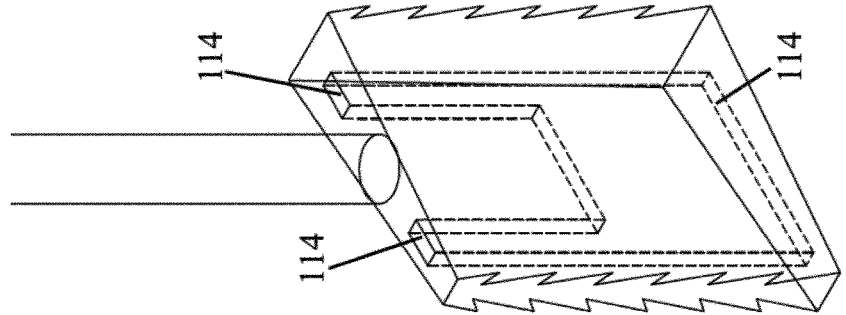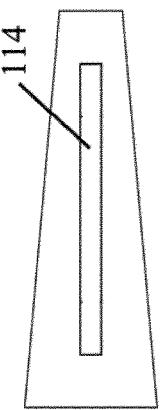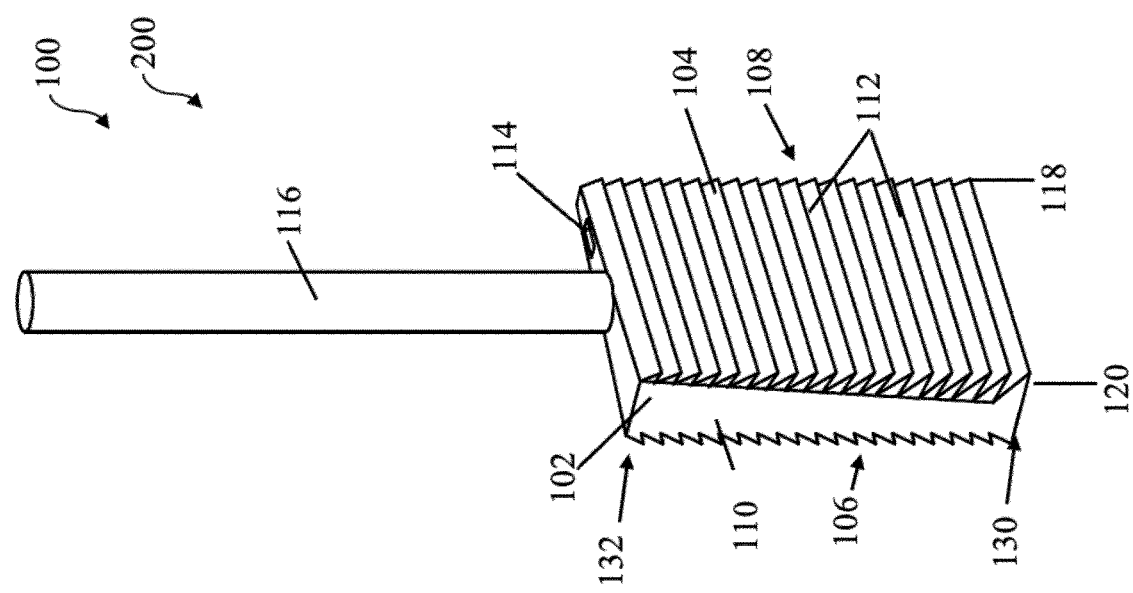

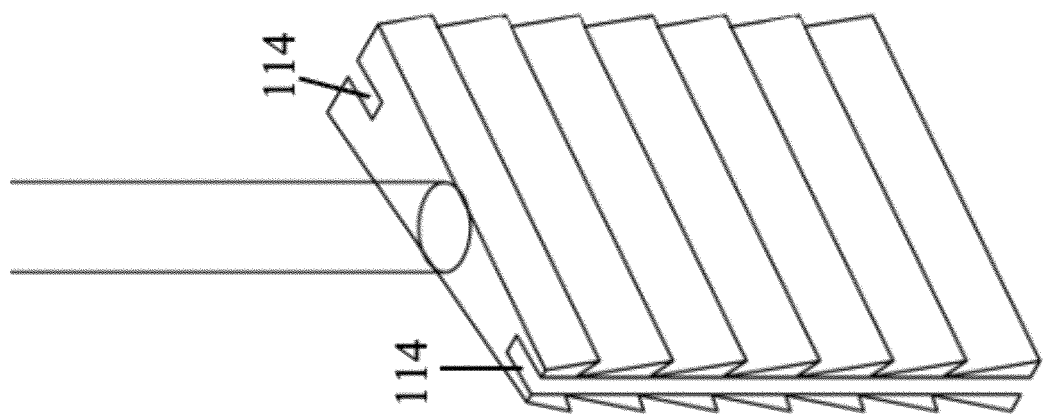

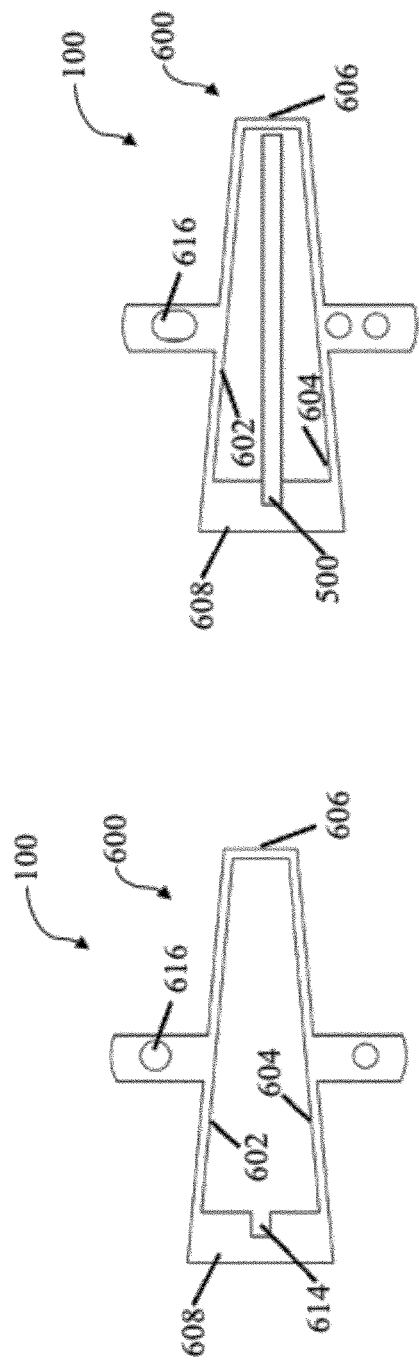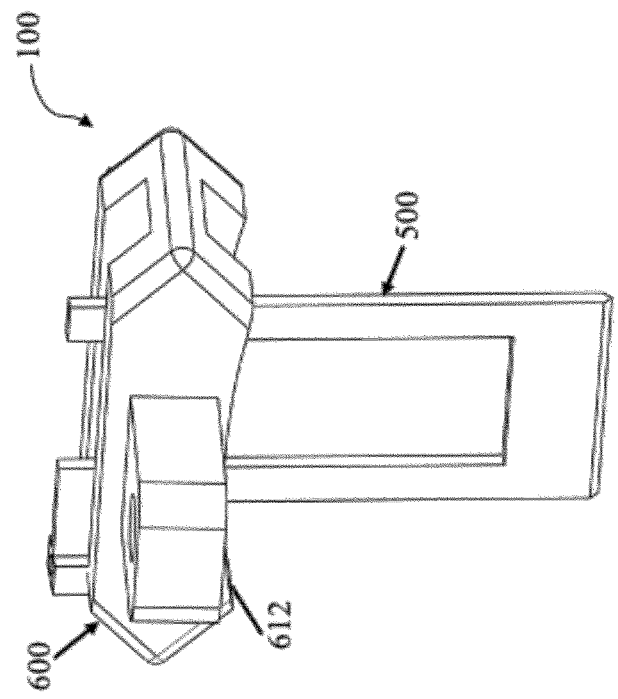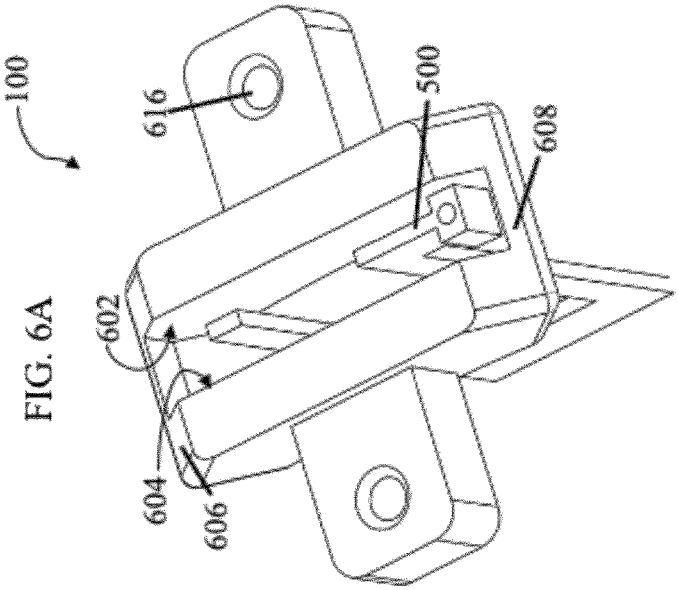

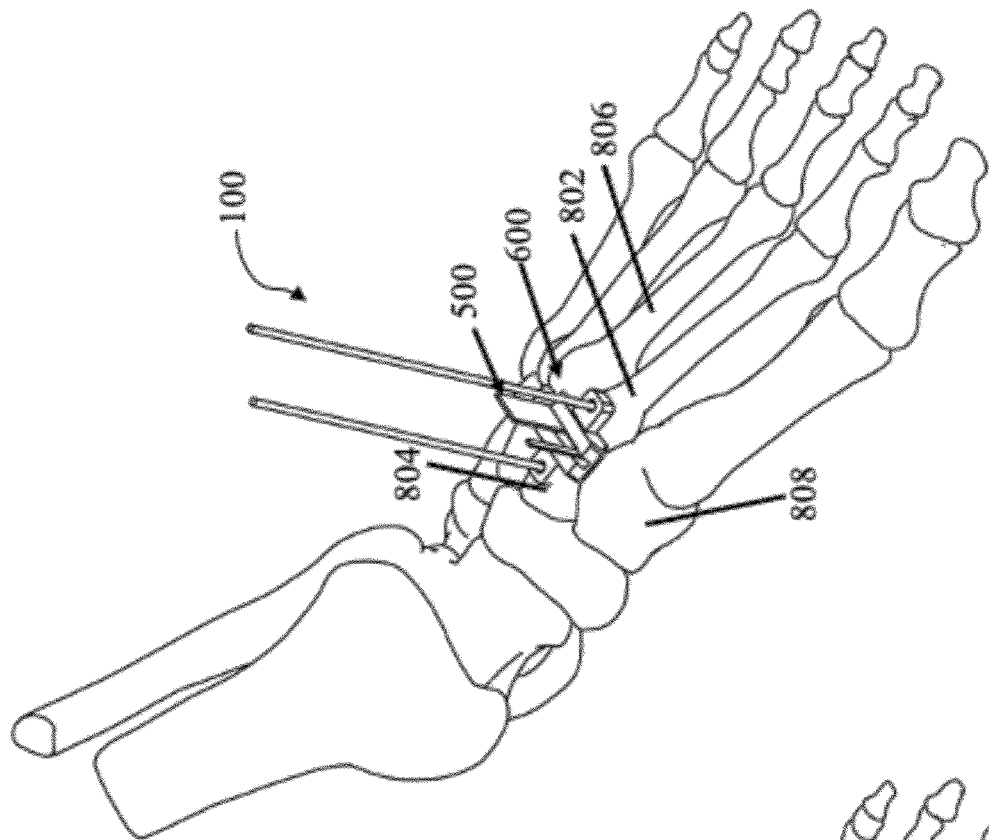
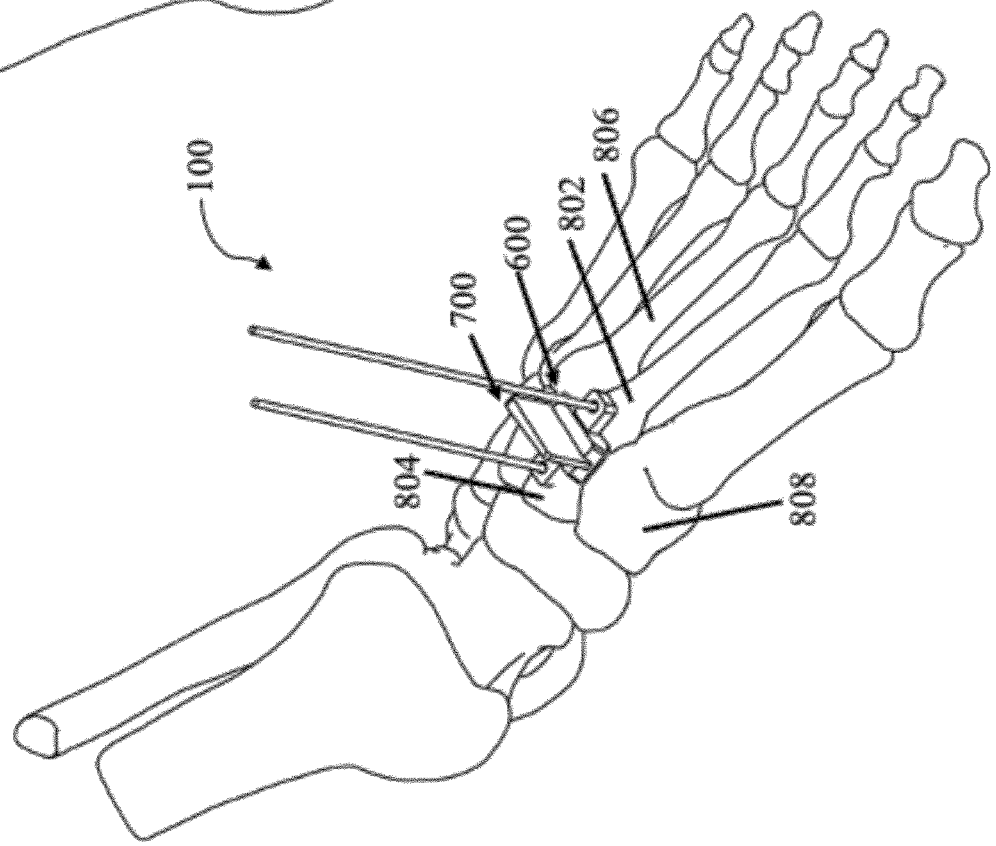
FIG. 10B
FIG. 10A

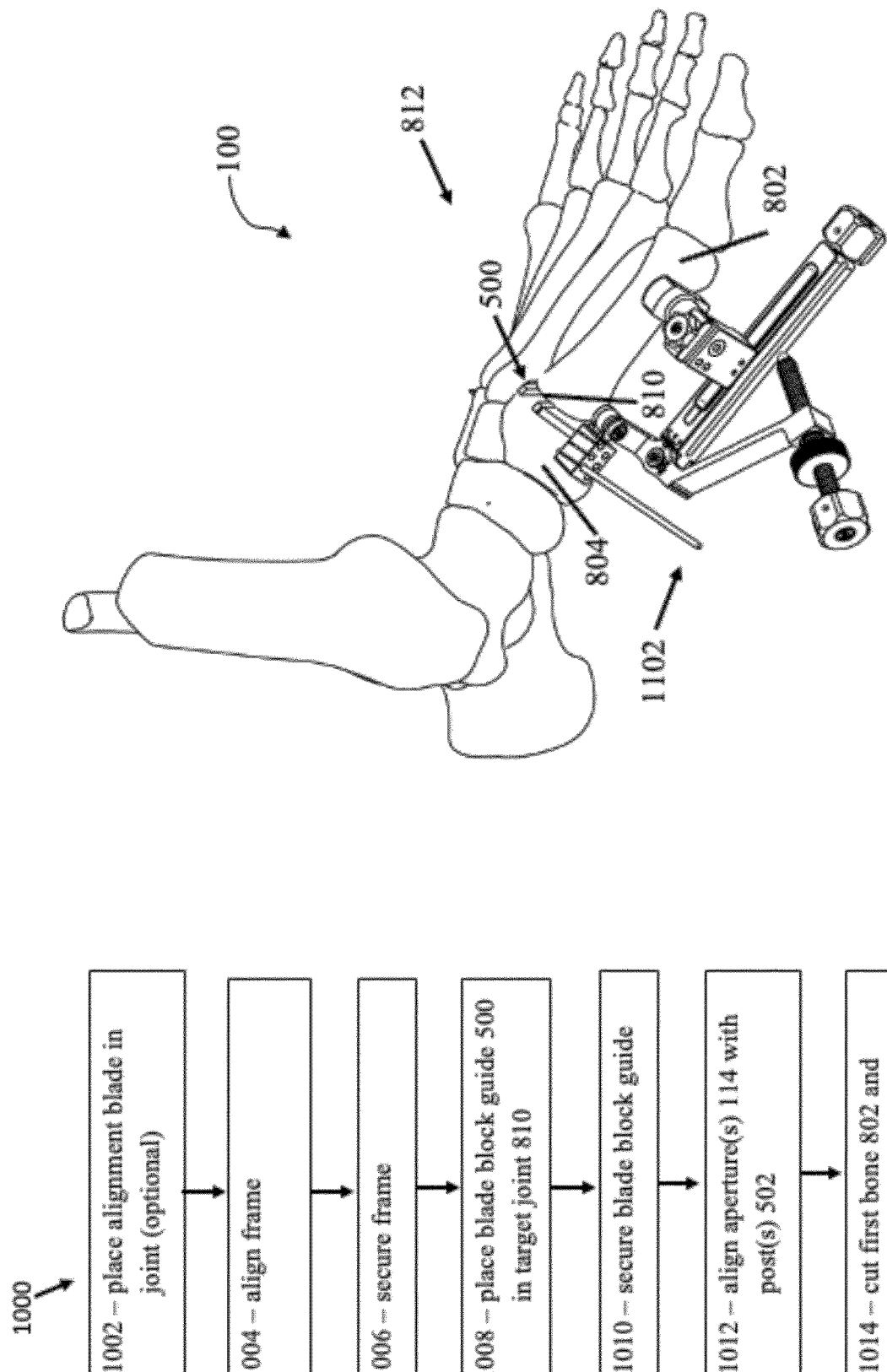

SURGICAL INSTRUMENTS, SYSTEMS, AND METHODS FOR PERFORMING AN OSTEOTOMY

FIELD OF THE TECHNOLOGY

The present technology relates generally to surgical cutting apparatus, and more particularly to, surgical instruments, systems, and methods for performing osteotomies.

BACKGROUND

Surgical cutting instruments come in many shapes and sizes. In performing an osteotomy with a traditional single-sided cutting device, the user (e.g., a physician, surgeon, etc.) is often required to perform multiple cuts and/or passes to achieve a desired shape and/or osteotomy. Further, multiple cuts and/or passes using a surgical instrument can result in inconsistencies in shape and/or size of the osteotomy in different patients. In other words, traditional single-sided surgical cutting instruments take more time to perform an osteotomy than is otherwise needed and/or there is a degree of inconsistency and/or inaccuracy in performing an osteotomy.

SUMMARY

Various embodiments disclosed herein provide surgical systems, instruments, and methods for performing osteotomies. A surgical system can comprise a body, and the body can comprise a first surface with a first plurality of cutting blades positioned on the first surface. The body can comprise a second surface with a second plurality of cutting blades positioned on the second surface. The body can comprise a third surface and a fourth surface. The first surface, the second surface, the third surface, and the fourth surface can be parallel to a reference axis. The first surface can be angled with respect to the second surface.

Each of the cutting blades of the first plurality of cutting blades can comprise a first blade height. Each of the cutting blades of the second plurality of cutting blades can comprise a second blade height. The first blade height and the second blade height can be the same, or they can be different.

The first plurality of cutting blades can comprise a first plurality of columns of cutting blades positioned on the first surface. Each of the blades in the columns of the first plurality of columns can all have the same blade height, or each of the cutting blades in at least two of the columns of the first plurality of columns can have different blade heights. Each cutting blade of at least one column of the first plurality of columns can comprise the first blade height.

The first plurality of columns can comprise a first column comprised of the first blade height, and a second column comprised of a third blade height. The first blade height can be greater than the third blade height. The columns of the first plurality of columns can alternate between the first column (or the first blade height) and the second column (or the third blade height).

The second plurality of cutting blades can comprise a second plurality of columns of cutting blades positioned on the second surface. Each of the blades in the columns of the second plurality of columns can all have the same blade height, or each of the cutting blades in at least two of the columns of the second plurality of columns can have different blade heights. Each cutting blade of at least one column of the second plurality of columns can comprise the second blade height.

The second plurality of columns can comprise a third column which comprises the second blade height, and a fourth column which comprises a fourth blade height. The second blade height can be greater than the fourth blade height. The columns of the second plurality of columns can alternate between the third column (or the second blade height) and the fourth column (or the fourth blade height). The third blade height can be the same as the fourth blade height.

The surgical system can further comprise an attachment mechanism. The attachment mechanism can be configured to couple to a reciprocating saw.

The body can further comprise at least one aperture. The at least one aperture can extend at least partially through the body. The at least one aperture can be configured to conform with a blade block guide. The blade block guide can comprise at least one post. The blade block guide can comprise at least two posts. At least two of the at least two posts can comprise different shapes.

BRIEF DESCRIPTION OF THE DRAWINGS

To readily understand the advantages and benefits of the technology, a more particular description of the technology briefly described above will be rendered by reference to specific embodiments that are illustrated in the appended drawings. Understanding that these drawings depict typical embodiments of the technology, and are therefore not to be considered to be limiting of its scope, the technology will be described and explained with additional specificity and detail through the use of the accompanying drawings, in which:

FIGS. 1A through 1D are schematic diagrams illustrating various embodiments of a surgical system including a blade block with multiple cutting blades;

FIG. 3 is a schematic diagram illustrating another embodiment of a surgical system including a blade block;

FIGS. 4A through 4F are schematic diagrams illustrating various embodiments of a double-sided surgical instrument including at least one aperture;

FIGS. 6A through 6D are schematic diagrams illustrating various embodiments of a surgical system including a frame;

FIGS. 10A through 10D are schematic diagrams illustrating various embodiments of a surgical system positioned on a foot;

FIG. 10E is a flow chart for one method for using an embodiment of a surgical system;

FIG. 11 is a schematic diagram illustrating an embodiment of a surgical system positioned on a foot;

DETAILED DESCRIPTION OF THE DRAWINGS

Figure 1D:
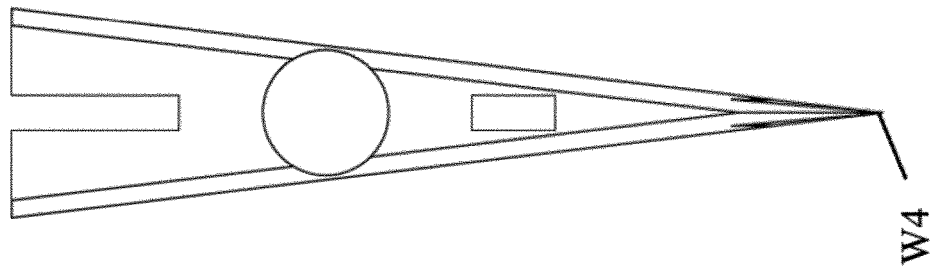

It should be understood that the language used in the present disclosure has been principally selected for readability and instructional purposes, and not to limit the scope of the subject matter disclosed herein in any manner. Further, reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including, but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

In addition, as used herein, the term "set" can mean "one or more," unless expressly specified otherwise. The term "sets" can mean multiples of or a plurality of "one or mores," "ones or more," and/or "ones or mores" consistent with set theory, unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments. Aspects of the embodiments are described below with reference to schematic flowchart diagrams and/or schematic block diagrams of methods, apparatuses, and systems according to embodiments. The schematic flowchart diagrams and/or schematic block diagrams in the Figures illustrate the structure, functionality, and operation of possible implementations of apparatuses, systems, and methods according to various embodiments.

It should also be noted that, in some alternative implementations, the functions noted in the block may occur out of the order noted in the Figures. For example, two blocks shown in succession may, in fact, be executed substantially concurrently, or the blocks may sometimes be executed in the reverse order. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment.

The present technology may include any type of surgical system and is not limited to the style of surgical system depicted in the drawings. Furthermore, the described features, structures, or characteristics of the various embodiments may be combined in any suitable manner. One skilled in the relevant art will recognize, however, that embodiments may be practiced without one or more of the specific details, or with other methods, components, materials, and so forth. In other instances, well-known structures, and/or materials are not shown or described in detail to avoid obscuring aspects of an embodiment.

Turning now to the Figures, FIGS. 1A through 1D are schematic diagrams illustrating various embodiments of a surgical system 100. In various embodiments, the surgical system 100 can be utilized to perform a wedge-shaped osteotomy, straight-cut osteotomy, and/or parallel-cut osteotomy. Further, the wedge-shaped osteotomy, straight-cut osteotomy, and/or parallel-cut osteotomy can be achieved with a single cut or a single pass utilizing the surgical system 100.

The surgical system 100 may be formed of and/or include any suitable material that is known or developed in the future capable of being used to perform an osteotomy. In various embodiments, the surgical system 100 is constructed of a sterilized suitable material that is capable of cutting bone. In some embodiments, the surgical system 100 is formed of and/or includes stainless steel, radio-opaque, titanium, titanium alloy, nitinol, and/or aluminum, etc., among other suitable materials that are possible, each of which is contemplated herein. In additional or alternative embodiments, the surgical system 100 is formed of and/or includes surgical grade stainless steel, among other suitable surgical grade materials that are possible, each of which is contemplated herein.

At least in the illustrated embodiment, the surgical system 100 includes a blade block 200. The blade block 200 includes, among other features and/or structures, a body 102 including at least a first surface 104, a second surface 106, a third surface 108, and a fourth surface 110. The body 102 may include any suitable dimension(s) and/or shape(s) that are capable of being utilized to perform an osteotomy. In various embodiments, the body 102 includes one or more dimensions and/or one or more shapes that are suitable for performing an osteotomy on a human. In various embodiments, the body 102 includes one or more dimensions and/or one or more shapes that is/are suitable for performing at least one of a Lapidus procedure, a metadductus procedure, metatarsus adductus, talar-navicular fusion, calcaneal cuboid fusion, and shortening osteotomies, etc., among other surgical procedures that are possible, each of which is contemplated herein.

The body 102, in various embodiments, includes a length L1 in the range of about five millimeters (5 mm) to about seventy millimeters (70 mm), among other ranges of length and/or lengths that are possible, each of which is contemplated herein. In some embodiments, the body 102 includes a length L1 of about twenty millimeters (20 mm), among other lengths that are possible, each of which is contemplated herein. In certain embodiments, the length L1 is less than twenty millimeters (20 mm) and in other embodiments the length L1 is greater than twenty millimeters (20 mm).

In various embodiments, the body 102 further includes a first width W1 at a distal end 130 and a second width W2 at a proximal end 132. The first width W1, in various embodiments, is in the range of about five millimeters (5 mm) to about fifty millimeters (50 mm), among other ranges of width and/or widths that are possible, each of which is contemplated herein. In some embodiments, the first width W1 is about fifteen millimeters (15 mm), among other widths that are possible, each of which is contemplated herein. In certain embodiments, the first width W1 is less than fifteen millimeters (15 mm) and in other embodiments the first width W1 is greater than fifteen millimeters (15 mm).

The second width W2, in various embodiments, is in the range of about five millimeters (5 mm) to about fifty millimeters (50 mm), among other ranges of width and/or widths that are possible, each of which is contemplated herein. In some embodiments, the second width W2 is about fifteen millimeters (15 mm), among other widths that are possible, each of which is contemplated herein. In certain embodiments, the second width W2 is less than fifteen millimeters (15 mm) and in other embodiments the second width W2 is greater than fifteen millimeters (15 mm).

In some embodiments, the first width W1 and the second width W2 are the same width or substantially the same width. In other embodiments, the second width W2 is greater than the first width W1. In alternative embodiments, the second width W2 is less than the first width W1.

The first surface 104 of the body 102 may include any suitable shape and/or profile that can facilitate or assist the surgical system 100 in performing an osteotomy (e.g., wedge-shaped osteotomy, straight-cut osteotomy, and/or parallel-cut osteotomy in one pass). In various embodiments, the first surface 104 includes a profile upon which one or more cutting blades 112 can be positioned.

Each of the cutting blades 112 can be coupled to and/or integral with the first surface 104. In various embodiments, the first surface 104 is parallel relative to a reference axis 125. In other embodiments the first surface 104 is angled relative to the reference axis 125, among other suitable profiles, angles, and/or planes that can facilitate and/or assist the surgical system 100 in performing an osteotomy and particularly, a wedge-shaped osteotomy. That is, the first surface 104 and/or surgical system 100 may include any suitable shape, plane, grade, slope, angle, relative angle, and/or profile that can facilitate and/or assist the surgical system 100 in performing a wedge-shaped osteotomy in one cut and/or one pass (e.g., a single cut and/or single pass).

The second surface 106 of the body 102 may include any suitable shape and/or profile that can facilitate or assist the surgical system 100 in performing an osteotomy (e.g., wedge-shaped osteotomy, straight-cut osteotomy, and/or parallel-cut osteotomy in one pass). In various embodiments, the second surface 106 can be located/positioned opposite the first surface 104 and may include any suitable profile upon which one or more cutting blades 112 can be positioned.

Each of the cutting blades 112 can be coupled to and/or integral with the second surface 106. In various embodiments, the second surface 106 can be parallel to the reference axis 125, angled relative to the reference axis 125, parallel relative to the first surface 104, or set at an angle 134 (see, FIG. 2C) relative to the first surface 104, among other suitable profiles, angles, and/or planes that can facilitate and/or assist the surgical system 100 in performing an osteotomy and particularly, a wedge-shaped osteotomy. That is, the second surface 106 and/or surgical system 100 may include any suitable shape, plane, grade, slope, angle, relative angle, and/or profile that can facilitate and/or assist the surgical system 100 in performing a wedge-shaped osteotomy in one cut and/or one pass. The angle 134 can be in the range of about 0 degrees (0°) to about 45 degrees (45°), among other angles or ranges of angles that are possible, each of which is contemplated herein.

The third surface 108 of the body 102 may include any suitable shape and/or profile that can facilitate or assist the surgical system 100 in performing an osteotomy (e.g., wedge-shaped osteotomy, straight-cut osteotomy, and/or parallel-cut osteotomy in one pass). In various embodiments, the third surface 108 can be parallel to the reference axis 125 or the third surface 108 can be angled relative to the reference axis 125.

The third surface 108 can include any suitable shape that is known or developed in the future that can facilitate or assist the surgical system 100 in performing an osteotomy (e.g., wedge-shaped osteotomy, straight-cut osteotomy, and/or parallel-cut osteotomy in one pass). In various embodiments, the shape of the third surface 108 can include a square, a rectangular, a trapezoidal, or a rhomboidal shape, among other shapes that are possible, each of which is contemplated herein. In various embodiments, the third surface 108 includes a flat or substantially flat surface, among other profiles, angles, relative angles, and/or planes that are possible, each of which is contemplated herein.

The third surface 108 further includes a third width W3 at the distal end 130 and a fourth width W4 at the proximal end 132. In various embodiments, the third width W3 is in the range of about half of a millimeter (0.5 mm) to about ten millimeters (10 mm), among other ranges of width and/or widths that are possible, each of which is contemplated herein. In some embodiments, the third width W3 is about zero millimeters (0 mm) (see, FIGS. 1C and 1D). In some embodiments, the third width W3 is one millimeter (1 mm). In other embodiments, the third width W3 is less than one millimeter (1 mm) and in other embodiments the third width W3 is greater than one millimeter (1 mm).

In additional or alternative embodiments, the fourth width W4 is in the range of about one-half of a millimeter (0.5 mm) to about ten millimeters (10 mm), among other ranges of width and/or widths that are possible, each of which is contemplated herein. In some embodiments, the fourth width W4 is about zero millimeters (0 mm) (see, FIGS. 1C and 1D). In some embodiments, the fourth width W4 is one millimeter (1 mm). In other embodiments, the fourth width W4 is less than one millimeter (1 mm) and in other embodiments the fourth width W4 is greater than 1 mm.

A fourth surface 110 of the body 102 may include any suitable shape and/or profile that can facilitate or assist the surgical system 100 in performing an osteotomy (e.g., wedge-shaped osteotomy, straight-cut osteotomy, and/or parallel-cut osteotomy). In various embodiments, the fourth surface 110 can be parallel to the reference axis 125 or the fourth surface 110 can be angled relative to the reference axis 125.

The fourth surface 110 may include any shape that is known or developed in the future that can facilitate or assist the surgical system 100 in performing an osteotomy (e.g., wedge-shaped osteotomy, straight-cut osteotomy, and/or parallel-cut osteotomy in one pass). In various embodiments, the shape of the fourth surface 110 can include a square, a rectangular, a trapezoidal, or a rhomboidal shape, among other shapes that are possible, each of which is contemplated herein. In various embodiments, the fourth surface 110 includes a flat or substantially flat surface, among other profiles, angles, relative angles, and/or planes that are possible, each of which is contemplated herein.

In various embodiments, the fourth surface 110 further includes a fifth width W5 (see, FIG. 1B) at the distal end 130 and a sixth width W6 (see, FIG. 1B) at the proximal end 132. The fifth width W5, in various embodiments, is in the range of about 0.5 mm to about 20 mm, among other ranges of width and/or widths that are possible, each of which is contemplated herein. In certain embodiments, the fifth width W5 is 5 mm. In other embodiments, the fifth width W5 is less than 5 mm and in other embodiments the fifth width W5 is greater than 5 mm.

In additional or alternative embodiments, the sixth width W6 is in the range of about 0.5 mm to about 20 mm, among other ranges of width and/or widths that are possible, each of which is contemplated herein. In certain embodiments, the sixth width W6 is 5 mm. In other embodiments, the sixth width W6 is less than 5 mm and in other embodiments the sixth width W6 is greater than 5 mm.

In some embodiments, the fifth width W5 and the sixth width W6 are the same width or substantially the same width. In other embodiments, the sixth width W6 is greater than the fifth width W5. In alternative embodiments, the fifth width W5 is greater than the sixth width W6.

In several embodiments, the first surface 104 and/or the second surface 106 include(s) cutting blades 112 positioned thereon. As illustrated in various figures, the cutting blades 112 are spaced apart and positioned horizontally to form a set of cutting blades 112.

A set of cutting blades 112 may include any suitable quantity of cutting blades 112 that can facilitate and/or assist the surgical system 100 in performing an osteotomy and particularly, a wedge-shaped osteotomy. In various embodiments, the first surface 104 includes a suitable quantity of cutting blades 112 so that the surgical system 100 can perform a wedge-shaped osteotomy, a straight-cut osteotomy, and/or parallel-cut osteotomy in one cut and/or one pass.

In various embodiments, the first surface 104 and/or the second surface 106 includes a quantity of cutting blades 112 in the range of about one (1) cutting blade 112 to about one hundred (100) cutting blades 112, among other ranges of quantities and/or quantities of cutting blades 112 that are possible, each of which is contemplated herein.

Figure 2B:
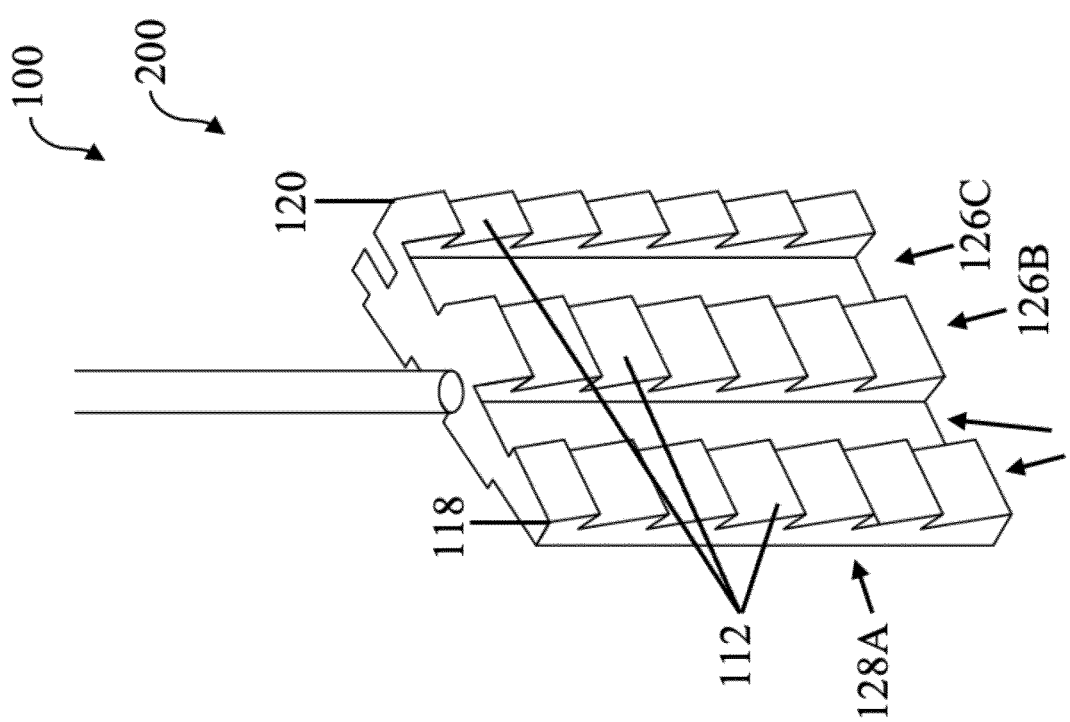
FIGS. 2A and 2B are schematic diagrams illustrating various embodiments of a surgical system including multiple columns of cutting blades.
Figure 2A:
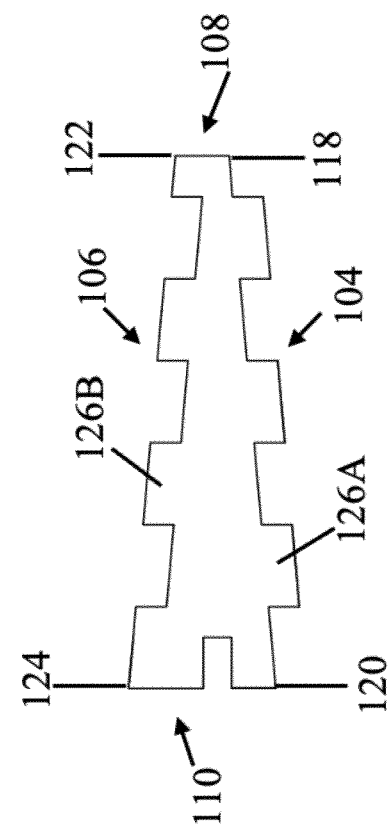

Referring now to FIGS. 2A and 2B, the cutting blades 112 may be included on the entirety or on substantially the entirety of the first surface 104. In other embodiments, the cutting blades 112 may be included on a portion or at least a portion of the first surface 104. That is, the cutting blades 112 may extend partially or fully from the distal end 130 to the proximal end 132.

In additional or alternative embodiments, a set of cutting blades 112 may be included on the entirety or substantially the entirety of the second surface 106. In other embodiments, the cutting blades 112 may be included on a portion or at least a portion of the second surface 106. That is, the cutting blades 112 may extend partially or fully from the distal end 130 to the proximal end 132.

The portion of the first surface 104 and/or the portion of the second surface 106 including the cutting blades 112 may include any suitable sized portion that can produce a wedge-shaped osteotomy, straight-cut osteotomy, and/or parallel-cut osteotomy. Various embodiments of the surgical system 100 may include varying sized portions of the first surface 104 and/or the second surface 106 including the cutting blades 112 so that different sized and/or shaped osteotomies can be obtained. That is, different embodiments may include cutting blades 112 with differing lengths and/or heights to produce different sized wedge-shaped osteotomies.

In some embodiments, the cutting blades 112 may extend partially (see, FIG. 2A) or fully (see, FIG. 1A) from a first edge 118 to a second edge 120 on the first surface 104. In some embodiments, the cutting blades 112 may extend partially (see, FIG. 2A) or fully (see, FIG. 1B) from a third edge 122 to a fourth edge 124 on the second surface 106.

Figure 2D:
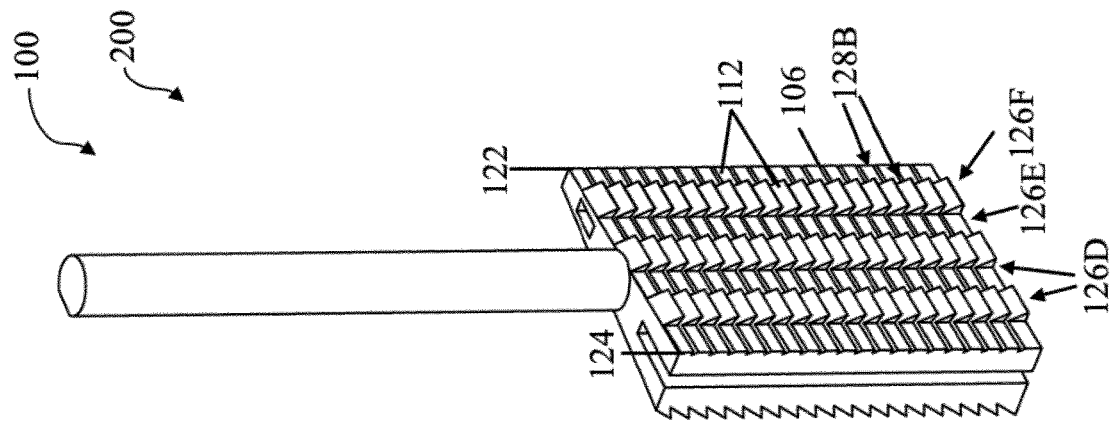
FIGS. 2C and 2D are schematic diagrams illustrating various other embodiments of a surgical system including multiple columns of cutting blades.
Figure 2C:
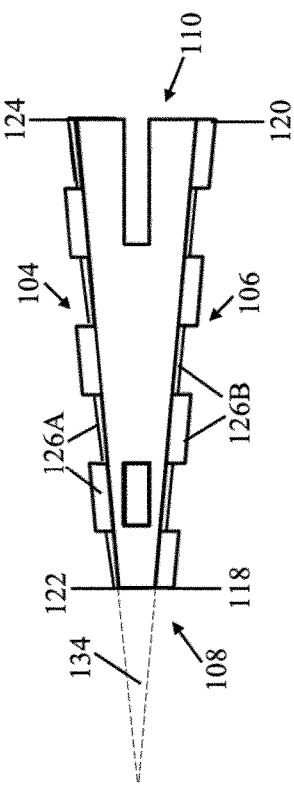
Figure 4E:
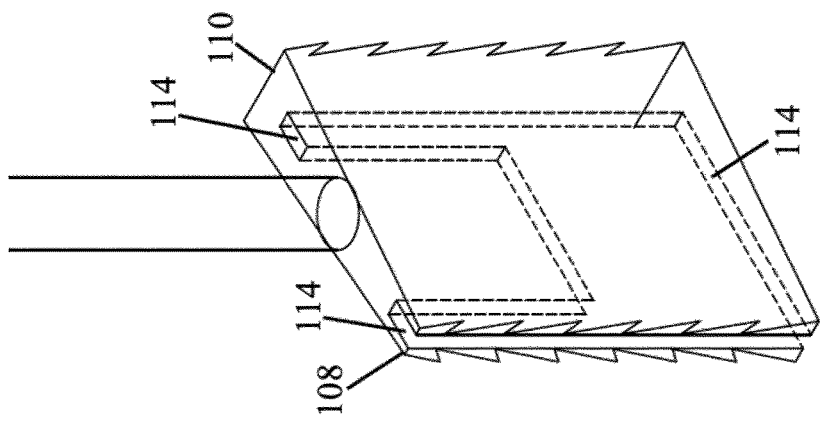
Figure 4C:
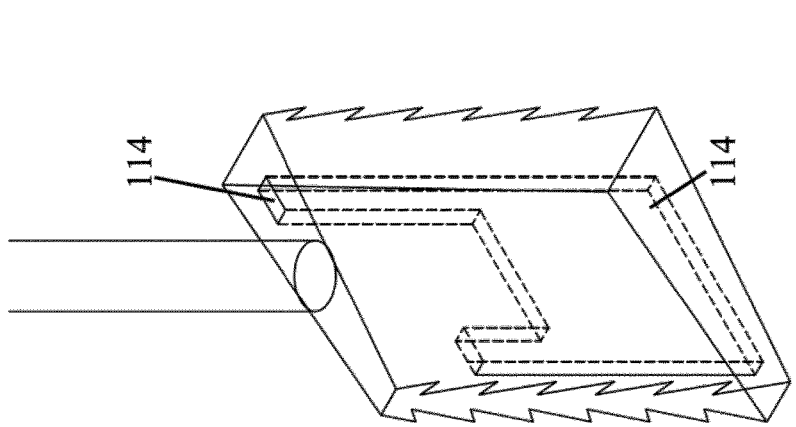
Figure 4D:
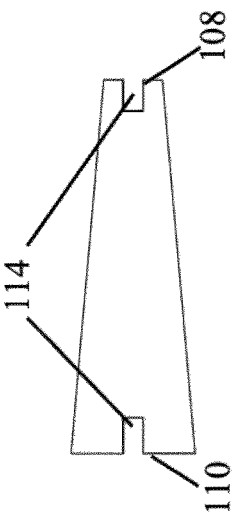
Figure 5C:
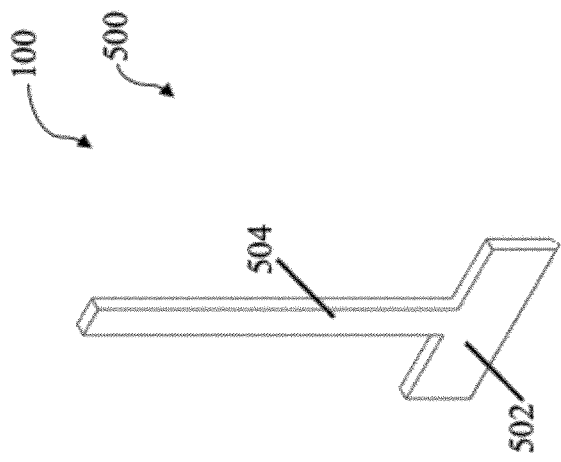
FIGS. 5A through 5F are schematic diagrams illustrating various embodiments of a blade block guide.
Figure 5F:
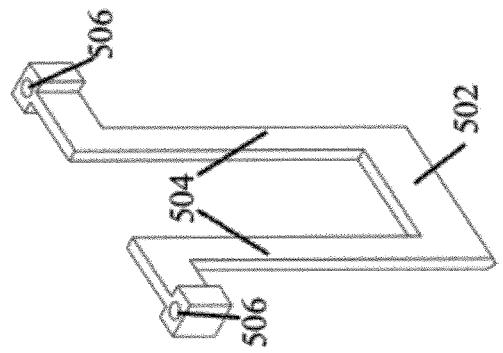
Figure 5B:
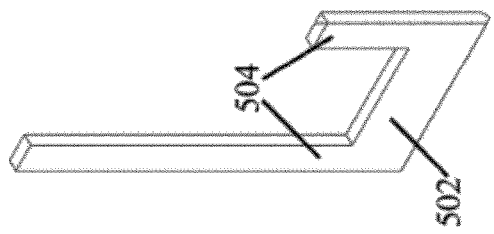
Figure 5E:
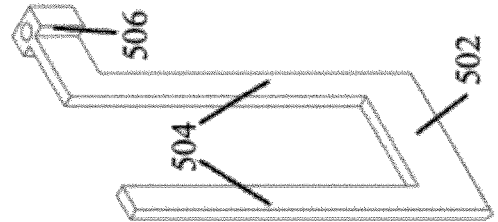
Figure 5A:
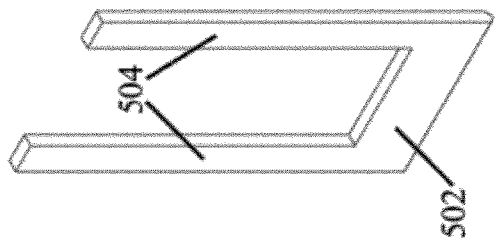
Figure 5D:
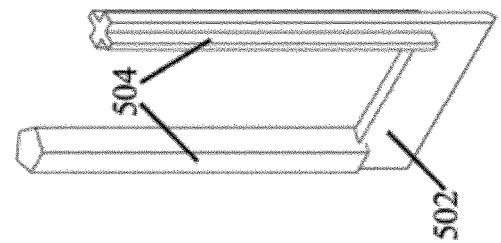

In certain embodiments, the cutting blades 112 can form a column 126 (or set of columns 126) of cutting blades 112 (see, FIGS. 2A and 2B). In additional or alternative embodiments, the cutting blades 112 can form a row 128 (or set of rows 128) of cutting blades 112. In some embodiments, the cutting blades 112 can form a matrix of rows 128A and columns 126A on the first surface 104 (see, FIG. 2B). In some embodiments, the cutting blades 112 can form a matrix of rows 128B and columns 126B on the second surface 106 (see, FIG. 2D).

A cutting blade 112 may include any suitable shape that can facilitate and/or assist the surgical system 100 in performing an osteotomy (e.g., wedge-shaped osteotomy, straight-cut osteotomy, and/or parallel-cut osteotomy). In various embodiments, a cutting blade 112 can include a curved blade (e.g., a vertically curved blade), a straight blade, waved blade (e.g., a horizontally curved blade), or a wavy blade (e.g., a blade with multiple horizontal curves), etc., among other suitable shapes that can facilitate cutting bone that are possible, each of which is contemplated herein. In additional or alternative embodiments, a cutting blade 112 can include a straight cutting edge and/or a serrated cutting edge, among other cutting edges that are possible, each of which is contemplated herein.

In some embodiments, all of the cutting blades 112 in the set of cutting blades 112 on the first surface 104 and/or on the second surface 106 include the same or substantially the same shape. In alternative embodiments, at least two cutting blades 112 in the set of cutting blades 112 on the first surface 104 and/or the second surface 106 include different shapes or substantially different shapes.

In one non-limiting example, at least one cutting blade 112 includes a straight blade and at least one cutting blade 112 includes a curved blade (or other non-straight blade), among other shapes and/or combinations of shapes that are possible, each of which is contemplated herein. In an additional or alternative non-limiting example, the straight blade(s) and/or the curved blade(s) include a serrated cutting edge.

In additional or alternative embodiments, a set of cutting blades 112 can include at least two subsets of cutting blades 112 in which a first subset of cutting blades 112 includes two or more cutting blades 112 including a first shape and at least a second subset of cutting blades 112 that includes two or more cutting blades 112 including a second, different shape. In some embodiments, one or more of the cutting blades 112 in one or more of the subsets of cutting blades 112 includes a serrated edge.

In further additional or alternative embodiments, the first subset of cutting blades 112 and the second subset of cutting blades 112 include the same quantity of cutting blades 112. In other embodiments, the first subset of cutting blades 112 and the second subset of cutting blades 112 include different quantities of cutting blades 112.

In yet further additional or alternative embodiments, the cutting blades 112 in the first subset of cutting blades 112 and the cutting blades 112 in the second subset of cutting blades 112 can be positioned in a pattern. The pattern may include any suitable pattern that is known or developed in the future that can assist in and/or facilitate performing an osteotomy (e.g., a wedge-shaped osteotomy, straight-cut osteotomy, and/or parallel-cut osteotomy). In some embodiments, the pattern may include cutting blades 112 with different shapes in an alternating pattern to provide alternating cutting blades 112, alternating columns of cutting blades 112, and/or alternating rows of cutting blades 112.

A cutting blade 112 may include any suitable height that can facilitate and/or assist the surgical system 100 in performing an osteotomy (e.g., a wedge-shaped osteotomy, straight-cut osteotomy, and/or parallel-cut osteotomy). In various embodiments, the cutting blades 112 can include a height in the range of about 0 mm (or flat) to about 10 mm, among other suitable heights that can facilitate cutting bone that are possible, each of which is contemplated herein. In certain embodiments, the cutting blades 112 include a height of three-quarters of a millimeter (0.75 mm). In some embodiments, the cutting blades 112 include a height greater than 0.75 mm and in other embodiments the cutting blades 112 include a height less than 0.75 mm.

In some embodiments, all of the cutting blades 112 in the set of cutting blades 112 on the first surface 104 include a uniform height (see, FIG. 1A). In other embodiments, any two cutting blades on the first surface 104 can include different heights.

In additional or alternative embodiments, one or more of the cutting blades 112 on the first surface 104 can include a height that gradually increases from the distal end 130 to the proximal end 132. In other embodiments, one or more of the cutting blades 112 on the first surface 104 can include a height that gradually decreases from the distal end 130 to the proximal end 132 (see, FIG. 3).

In some embodiments, the first surface 104 can include a plurality of columns 126A of cutting blades 112 positioned thereon. The plurality of columns 126A of cutting blades 112 can include at least a first column 126B of cutting blades 112 and a second column 126C of cutting blades 112. In some embodiments, each of the cutting blades 112 in the first column 126B can include the same height and each of the cutting blades 112 in the second column 126C can include the same height. The height of the cutting blades 112 in the first column 126B can be different from the height of the cutting blades 112 in the second column 126C. The first column 126B of cutting blades 112 and the second column 126C of cutting blades 112 can alternate to form a pattern of peaks and valleys (see, FIGS. 2A and 2B).

In some embodiments, all of the cutting blades 112 in the set of cutting blades 112 on the second surface 106 include a uniform height (see, FIG. 1B). In other embodiments, any two cutting blades 112 on the second surface 106 can include different heights.

In additional or alternative embodiments, one or more of the cutting blades 112 on the second surface 106 include a height that gradually increases from the distal end 130 to the proximal end 132. In other embodiments, one or more of the cutting blades 112 on the second surface 106 include a height that gradually decreases from the distal end 130 to the proximal end 132.

In some embodiments, the second surface 106 can include a second plurality of columns 126D of cutting blades 112 positioned thereon. The second plurality of columns 126D of cutting blades 112 can include at least a third column 126E of cutting blades 112 and a fourth column 126F of cutting blades 112.

Each of the cutting blades 112 in the third column 126E can include the same height, different heights, gradually increasing heights from the distal end 130 to the proximal end 132, or gradually decreasing heights from the distal end 130 to the proximal end 132. Each of the cutting blades 112 in the fourth column 126F can include the same height. The height of the cutting blades 112 in the third column 126E can be different from the height of the cutting blades 112 in the fourth column 126F. The third column 126E of cutting blades 112 and the fourth column 126F of cutting blades 112 can alternate to form a pattern of peaks and valleys (see, FIGS. 2C and 2D).

Figure 1C:
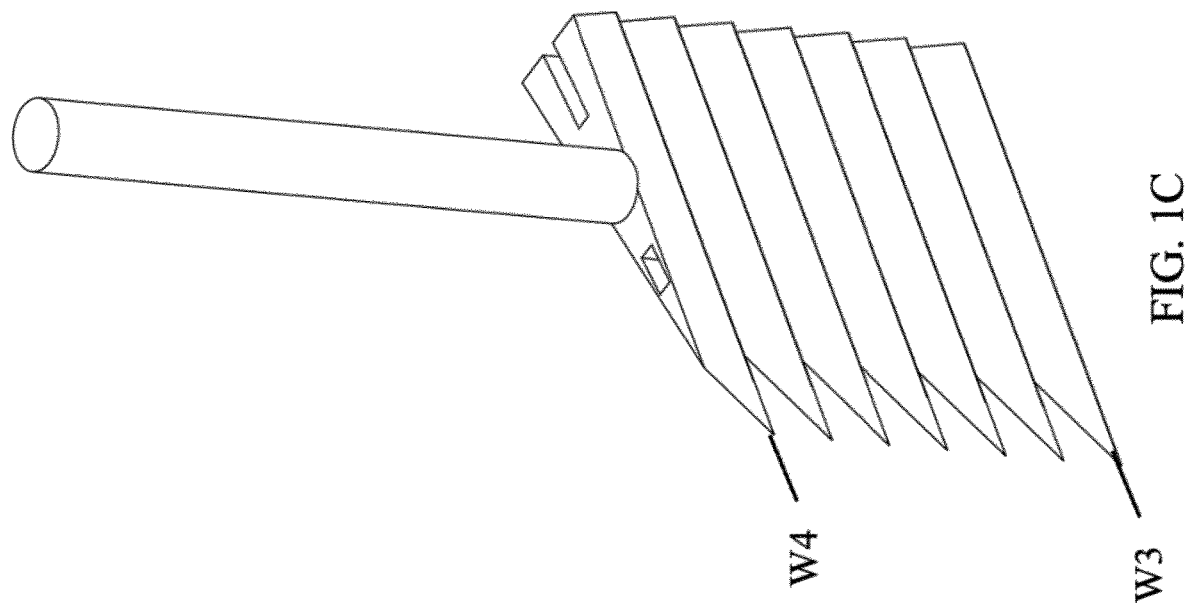

As further shown in FIGS. 1A through 1C, the proximal end 132 includes an attachment mechanism 116 positioned thereon. The attachment mechanism 116 may include any suitable size, dimensions, shape, and/or configuration that enables attachment of the surgical system 100 to a surgical instrument (not shown). That is, while the attachment mechanism 116 is shown as including a particular relative size, dimensions, shapes, and configurations, the various embodiments of the surgical system 100 are not limited to the illustrated attachment mechanism 116. That is, other embodiments of the attachment mechanism 116 may include one or more different relative sizes, dimension(s), shapes, and/or configurations. In some embodiments, the attachment mechanism 116 is configured to couple to a reciprocating saw or an oscillating saw, among other surgical instruments that are possible, each of which is contemplated herein.

Referring now to FIGS. 4A through 4F, the body 102 can include at least one aperture 114 (or set of apertures 114). The aperture(s) 114, can extend all the way through the body 102 from the distal end 130 to the proximal end 132, can extend partially from the distal end 130 to the proximal end 132, or can extend partially from the proximal end 132 to the distal end 130. The aperture 114, or each aperture in the set of apertures 114, can be in any suitable location that can facilitate performing an osteotomy (e.g., wedge-shaped osteotomy, straight-cut osteotomy, and/or parallel-cut osteotomy). For example, one or more of the apertures 114 can be within the body 102, along the first surface 104, along the second surface 106, along the third surface 108, and/or along the fourth surface 110 (see, FIGS. 4D, 4E, and 4F), or a combination of within the body 102 and along the first surface 104, along the second surface 106, along the third surface 108, and/or along the fourth surface 110. Any two of the apertures 114 in the set of apertures 114 can be the same or different size, shape, length, and/or thickness. The aperture(s) 114 can be configured to receive a blade block guide 500 (see, FIGS. 5A through 5F).

The aperture(s) 114 can be sized and/or shaped so as to ensure proper alignment of the body 102 with the blade block guide 500. For example, each of the apertures 114 can be a different shape so that the body 102 can be placed over the blade block guide 500 in only one configuration. The apertures 114 can be the same shape and size so that the body 102 can be placed over the blade block guide 500 in multiple configurations. The apertures 114 can be symmetrical, asymmetrical, or non-symmetrical about the reference axis 125.

Referring now to FIGS. 5A through 5F, the surgical system 100 can include a blade block guide 500. The blade block guide 500, in various embodiments, can include a base 502, a post 504, or set of posts 504. The post 504, or each post 504 of the set of posts 504 can be couplable, detachably couplable, or integral with the base 502. Any two posts 504 can be the same size or different sizes, the same shape or different shapes, the same length or different lengths, and/or the same thickness or different thicknesses. The post 504 or set of posts 504 can be configured to be received by the body 102. The posts 504 can be sized and/or shaped so as to ensure proper alignment of the body 102 with the blade block guide 500. For example, each of the posts 504 can be a different size and/or shape so that the body 102 can be placed on the blade block guide 500 in only one orientation. Alternatively, each of the post(s) 504 can be the same size and/or shape so that the body 102 can be placed on the blade block guide 500 in multiple orientations.

The blade block guide 500 can include at least one securing mechanism 506 (e.g., one or more securing mechanisms 506). The securing mechanism(s) 506 can be configured to be coupled to at least one of a first bone 802 (or a first bone portion 802), a second bone 804 (or a second bone portion 804), a third bone 806, a fourth bone 808, a frame 600, and/or a surgical jig 1100, among other structures and/or objects that are possible, each of which is contemplated herein. The securing mechanism 506 can be any mechanism that can facilitate performing an osteotomy (e.g., wedge-shaped osteotomy, straight-cut osteotomy, and/or parallel-cut osteotomy) in one pass, and temporarily fixates the blade block guide 500. For example, the securing mechanism 506 can include at least one aperture, pin, clamp, screw, locking screw, bolt, locking bolt, staple, and/or magnet, etc., among other devices or combination of devices that are possible, each of which is contemplated herein.

Turning now to FIGS. 6A through 6D, which are schematic diagrams illustrating various views of one embodiment of a frame 600. The surgical system 100 can include a frame 600 that can be utilized to perform an osteotomy, such as, a wedge-shaped osteotomy, straight-cut osteotomy, and/or parallel-cut osteotomy. Further, the osteotomy can be achieved with a single cut or single pass utilizing the surgical system 100.

At least in the illustrated embodiment, the frame 600 includes, among other features, a first side 602, a second side opposite the first side 602, a securing device 610. The first side 602 and the second side 604 can include any suitable profile that can facilitate and/or assist the surgical system 100 in performing an osteotomy and particularly, a wedge-shaped osteotomy.

The first side 602, in various embodiments, may be straight (e.g., perpendicular to a bottom surface 612), or it may be angled (e.g., at an angle other than perpendicular to the bottom surface 612). The second side 604 may also be straight (e.g., perpendicular to the bottom surface 612), or it may be angled (e.g., at an angle other than perpendicular to the bottom surface 612).

In certain embodiments, first side 602 may be parallel with respect to the second side 604. In alternative embodiments, the first side 602 may be non-parallel with respect to the second side 604.

The frame 600, in various embodiments, can include a first barrier 606. In further embodiments, the frame 600 can include a second barrier 608. The frame 600 can include any suitable dimensions that can assist in performing an osteotomy.

The frame 600 can further include an attachment mechanism 616. The attachment mechanism 616 can include at least one aperture, pin, clamp, screw, locking screw, bolt, locking bolt, staple, and/or magnet, etc., among other devices or combination of devices that are possible, each of which is contemplated herein.

The frame 600 can include a complimentary securing mechanism 614 that can be configured to couple with the blade block guide 500. The complimentary securing mechanism 614 can include at least one of a notch, a post, pin, latch, clasp, and/or an aperture, etc., among other mechanisms that are possible, each of which is contemplated herein.

Figure 7C:
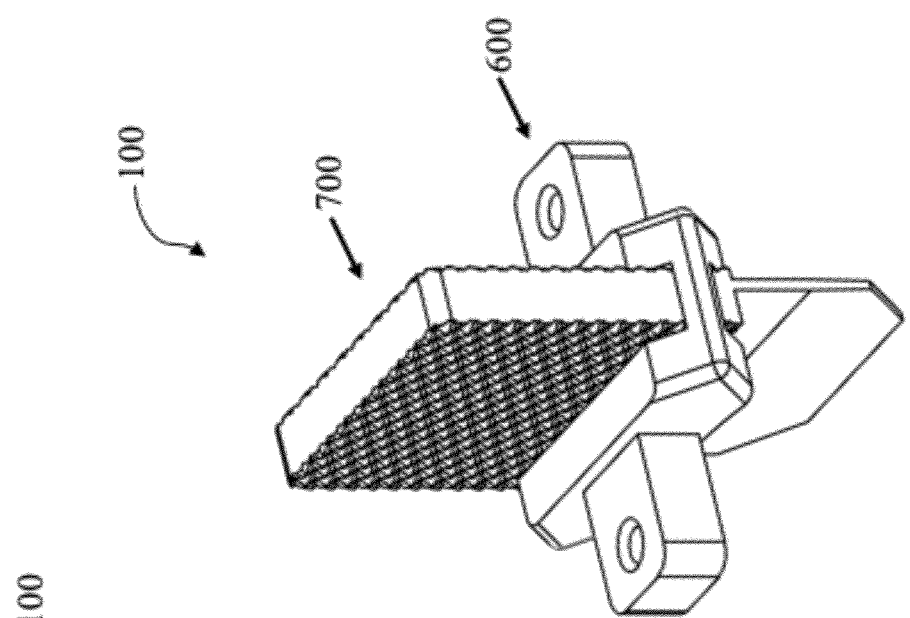
FIGS. 7A through 7C are schematic diagrams illustrating various embodiments of a surgical system including an alignment blade.
Figure 7B:
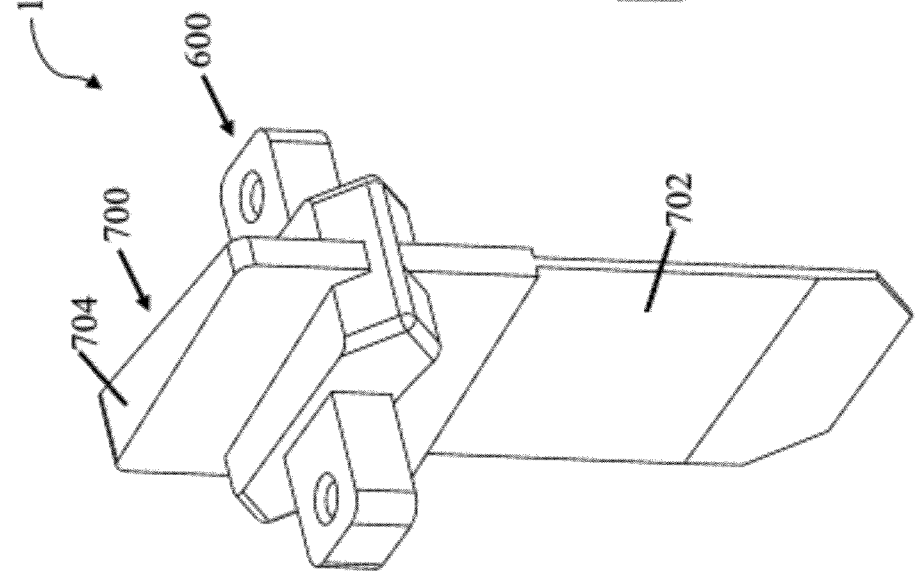
Figure 7A:
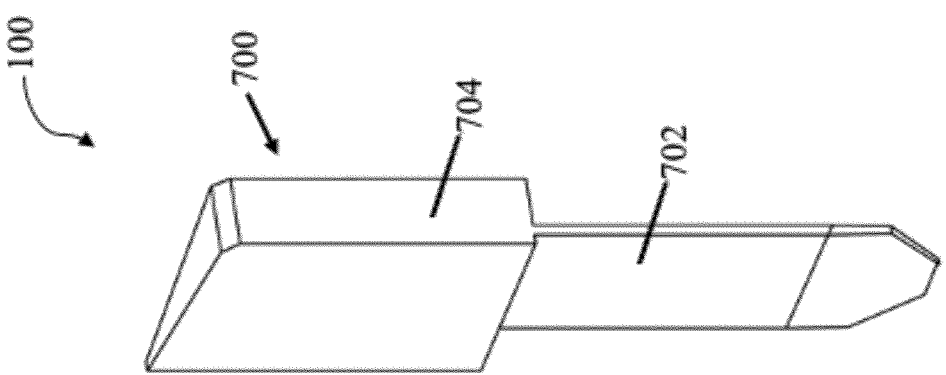

FIGS. 7A through 7C illustrate various embodiments of an aligner 700. The aligner 700, in various embodiments, can include a shim 702.

The shim 702 can include any suitable size and/or shape to assist in performing an osteotomy, such as, a wedge-shaped osteotomy, straight-cut osteotomy, and/or parallel-cut osteotomy. The shim 702 can have a shim width. The shim width can be uniform, tapered, and/or curved, etc., among other shapes that are possible, each of which is contemplated herein. The shim 702 can include a shim depth which can be uniform, and/or tapered, among other shapes that are possible, each of which is contemplated herein.

In various embodiments, the aligner 700 can further include a grip 704. The grip can be at least one of tapered (see, FIGS. 7A and 7B), straight (see, FIG. 7C), partially tapered, and partially straight, among other shapes and/or sizes that are possible, each of which is contemplated herein. At least a portion of the grip 704 surface can be high friction, or have a high friction coating, such as, knurling, grooves, titanium coating, stippling, rubber, among other surfaces that are possible, each of which is contemplated herein. The shim 702 can be centered on or off-center from the grip 704.

Figure 8B:
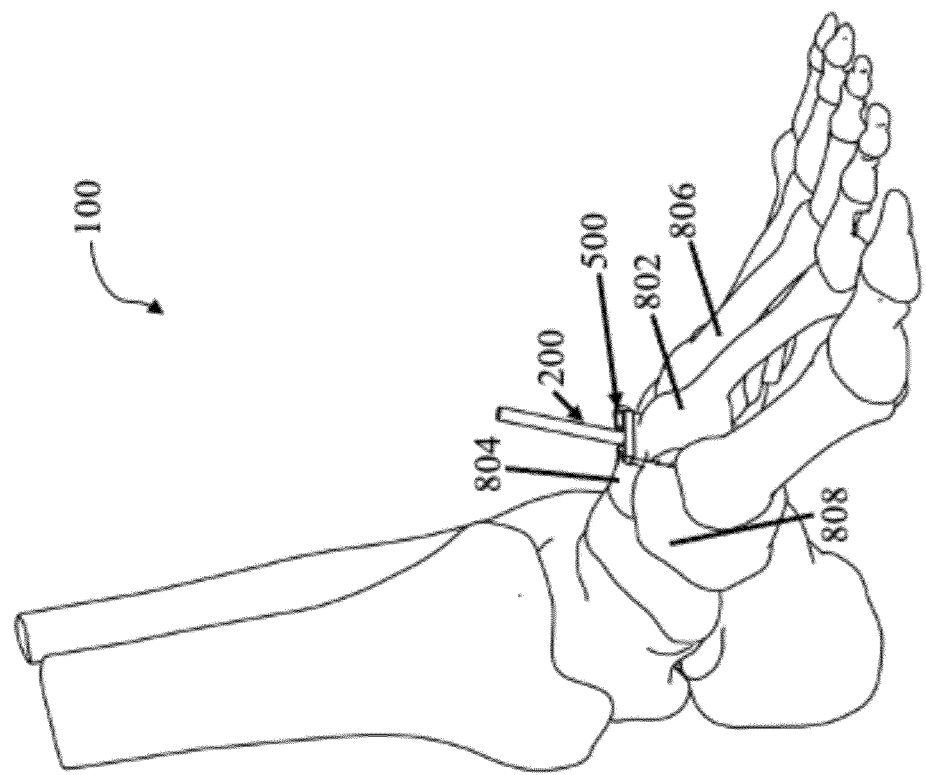
FIGS. 8A and 8B are schematic diagrams illustrating various embodiments of a surgical system positioned on a foot.
Figure 8A:
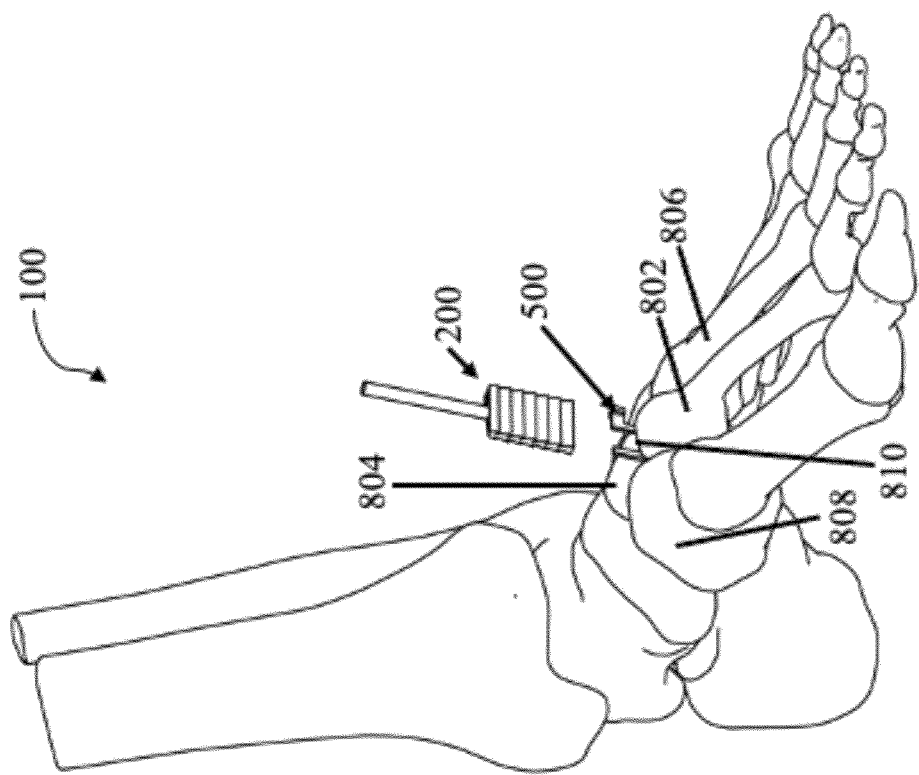

FIGS. 8A and 8B illustrate one embodiment of the surgical system 100 as explained below.

Figure 8C:
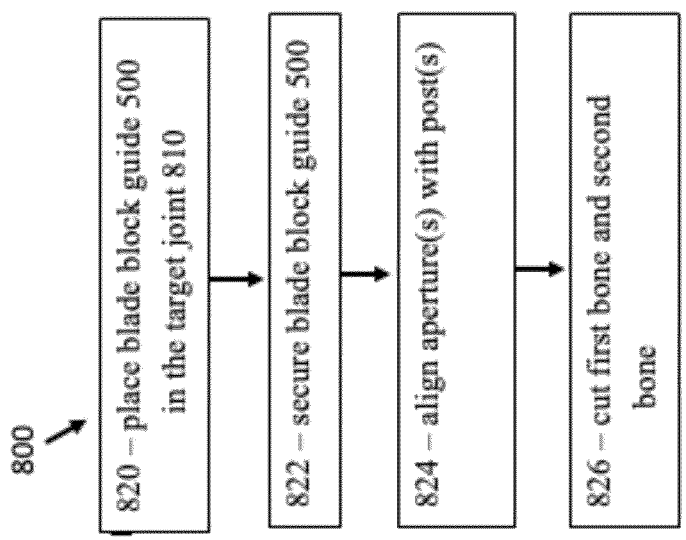
FIG. 8C is a flow chart for one method for using an embodiment of a surgical system.

FIG. 8C is a schematic flow chart diagram illustrating one embodiment of a method 800 for performing an osteotomy (e.g., wedge-shaped osteotomy, straight-cut osteotomy, and/or parallel-cut osteotomy). The osteotomy may be between any two bones separated by a joint, or the osteotomy may be on a single bone (e.g., in a human or animal).

At least in the illustrated embodiment, the method 800 can include positioning the blade block guide 500 in the target joint 810 (FIG. 8A) (block 820). In some embodiments the blade block guide 500 can be positioned perpendicular to the weight bearing surface (e.g., the transverse plane). In other embodiments the blade block guide 500 can be positioned non-perpendicular to the weight bearing surface (e.g., the transverse plane).

The blade block guide 500 can be secured (Block 822). The blade block guide 500 can be secured by coupling the securing mechanism 506 to the first bone 802, the second bone 804, the third bone 806, the fourth bone 808, the second surgical instrument 1130 (see, FIG. 11), among other bones, devices, and/or structures that are possible, each of which is contemplated herein.

In certain embodiments, the blade block guide 500 can be secured by coupling it to the third bone 806. The third bone 806 can be the second metatarsal (e.g., when the first metatarsocuneiform joint is the target joint 810), the third metatarsal (e.g., when the second metatarsocuneiform joint is the target joint 810), or the first metatarsal (e.g., when the second metatarsocuneiform joint is the target joint 810), among other bones that are possible, each of which is contemplated herein.

The aperture(s) 114 can be aligned with the post(s) 504 (Block 824). In some embodiments, the post 504 and the complimentary shaped aperture 114 can be shaped such that the blade block 200 can be aligned in only one configuration (e.g., the post 504 includes a non-symmetrical shape). In other embodiments, the post 504 and the complimentary shaped aperture 114 can be shaped such that the blade block 200 can be aligned in multiple configurations (e.g., a symmetrical shape). In certain embodiments, each of the posts 504 (and thus each of the complimentary shaped apertures 114) can be a different shape such that the blade block 200 can be aligned with the posts 504 in only one configuration. In other embodiments, each of the posts 504 (and thus each of the complimentary shaped apertures 114) can be the same shape such that the blade block 200 can be aligned with the posts 504 in multiple configurations.

The blade block 200 can move over the post(s) 504, allowing the first surface 104 to come into contact with the first bone 802 and plane and/or cut the end of the first bone 802. The blade block 200 can move over the post(s) 504, allowing the second surface 106 to come into contact with the second bone 804 and plane and/or cut the end of the second bone 804. The first bone 802 and the second bone 804 can be planed and/or cut simultaneously (see, FIG. 8B), allowing a surgeon to perform an osteotomy with one pass of the blade block 200 (Block 826). In some embodiments the first bone 802 and the second bone 804 are planed and/or cut simultaneously. In some embodiments the second bone 804 is planed and/or cut after the first bone 802 is planed and/or cut. In some embodiments the first bone 802 is planed and/or cut after the second bone 804 is planed and/or cut.

Figure 9B:
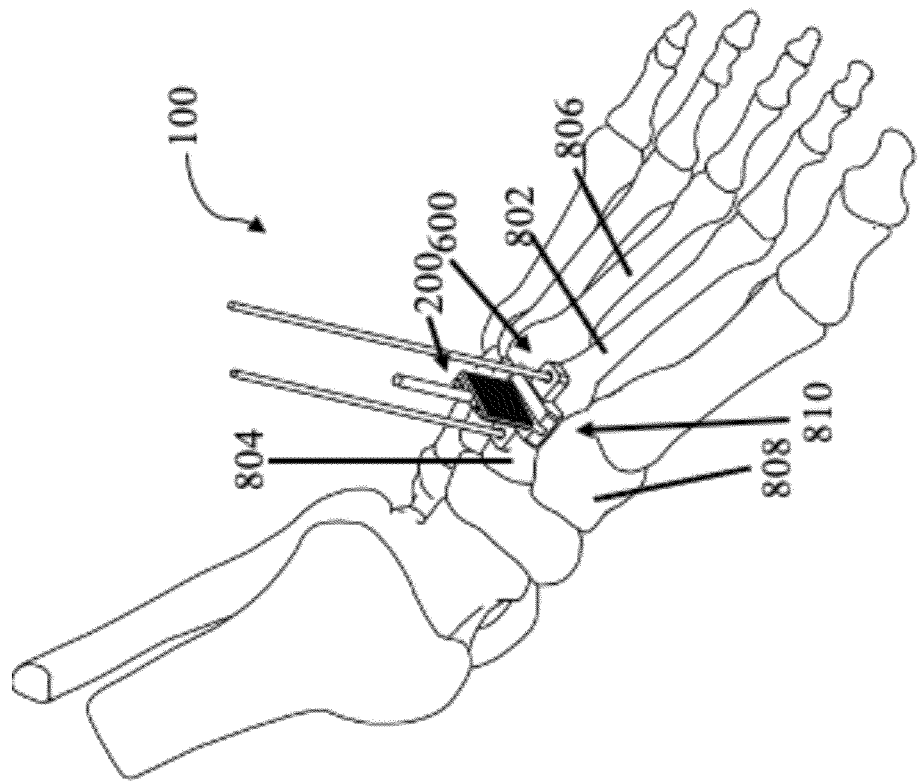
FIGS. 9A and 9B are schematic diagrams illustrating various embodiments of a surgical system positioned on a foot.
Figure 9A:
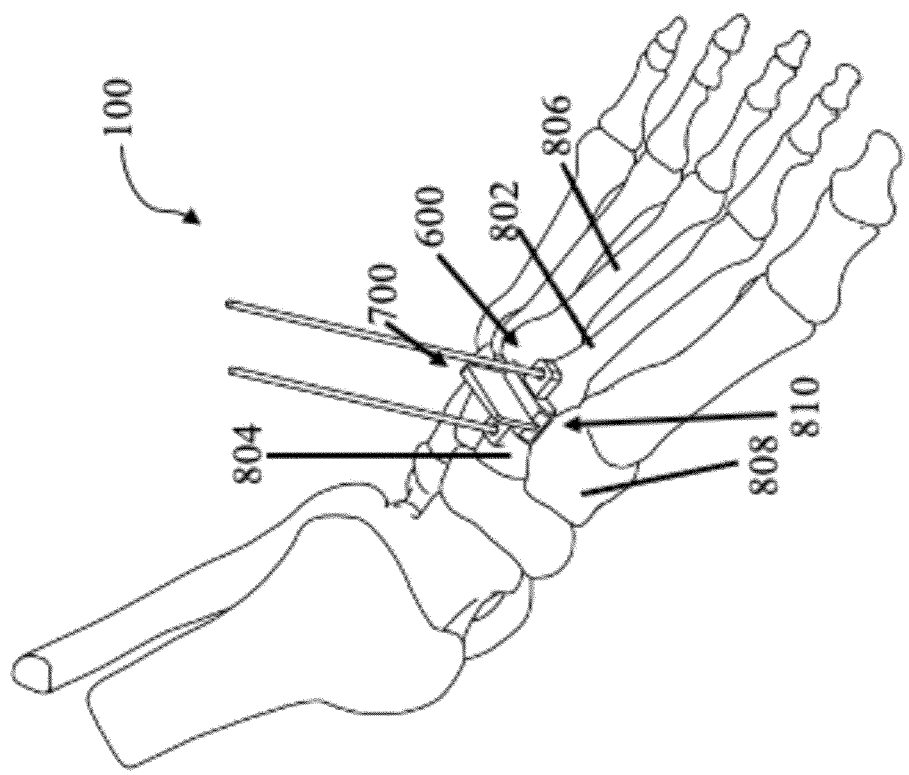

FIGS. 9A and 9B illustrate another embodiment of the surgical system 100.

Figure 9C:
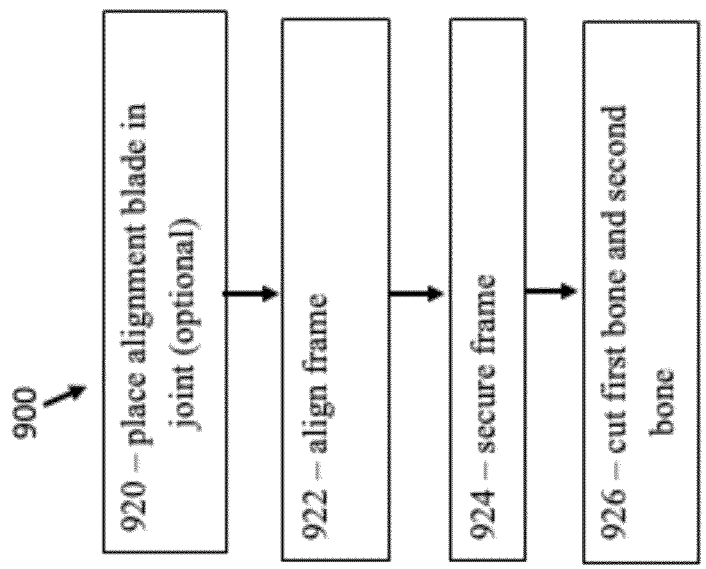
FIG. 9C is a flow chart for one method for using an embodiment of a surgical system.
Figure 10D:
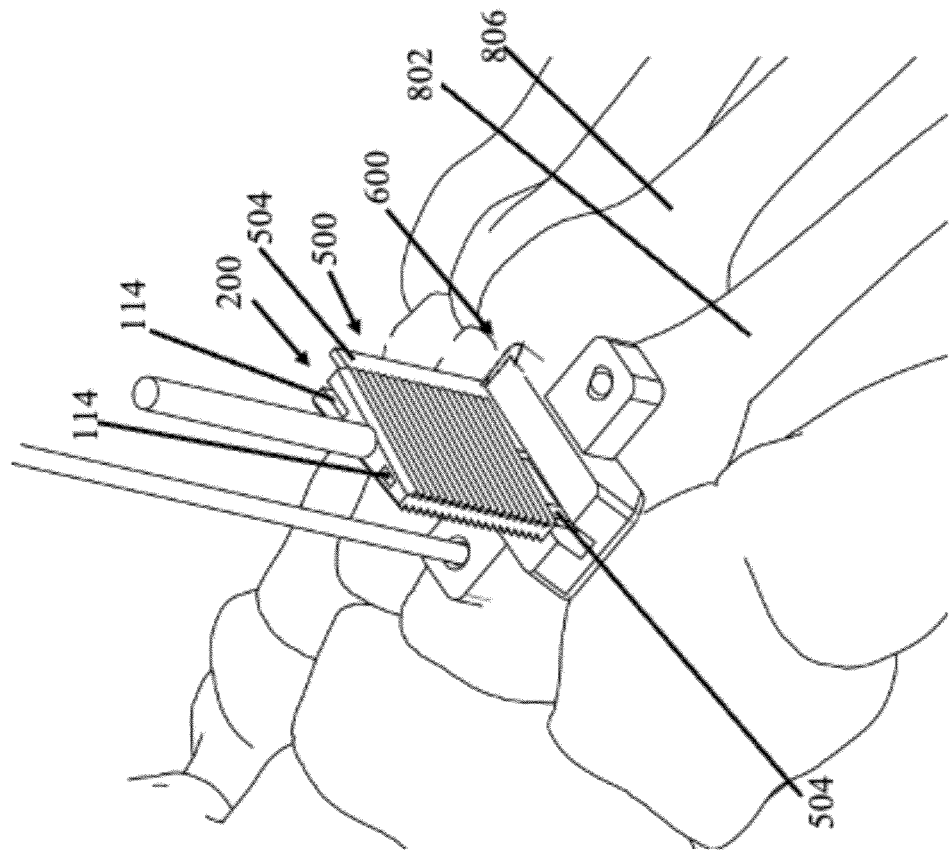
Figure 10C:
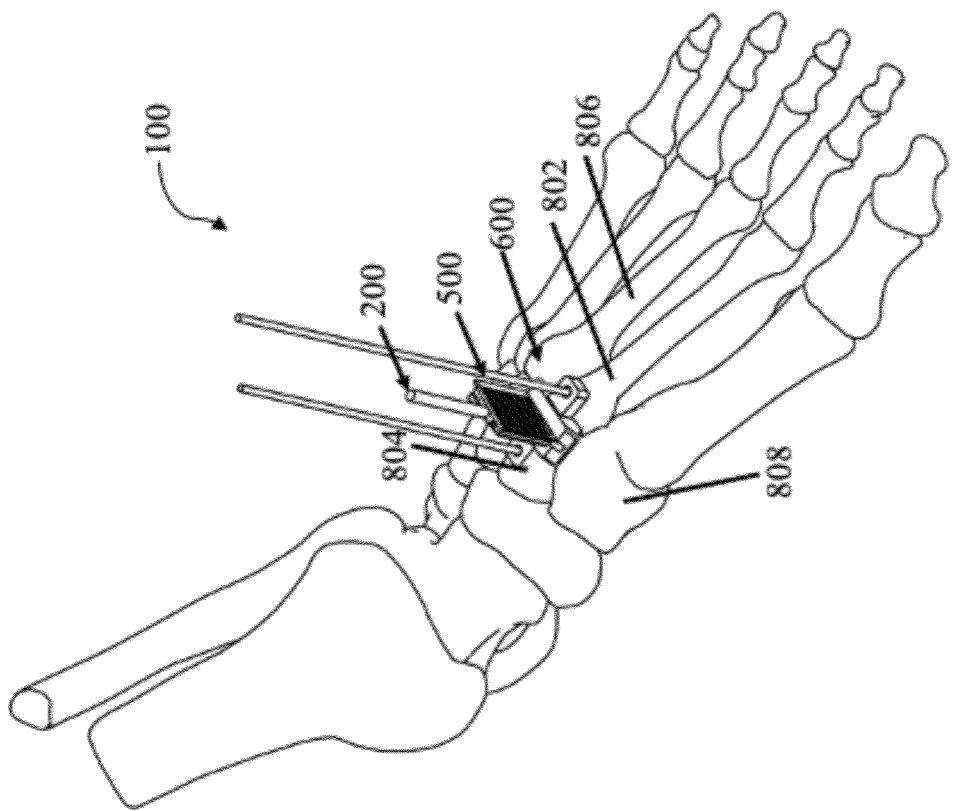

FIG. 9C is a schematic flow chart diagram illustrating one embodiment of a method 900 for performing an osteotomy (e.g., wedge-shaped osteotomy, straight-cut osteotomy, and/or parallel-cut osteotomy).

The alignment blade 700 can be placed within the target joint 810 (Block 920). In some embodiments the alignment blade 700 can be positioned perpendicular to the weight bearing surface (e.g., the transverse plane). In certain embodiments the alignment blade 700 can be positioned non-perpendicular to the weight bearing surface (e.g., the transverse plane).

The frame 600 can be positioned over the target joint 810 (FIG. 9A) (Block 922). In some embodiments, the frame 600 can be positioned such that the first side 602 is aligned with the desired osteotomy site on the first bone 802. In certain embodiments, the frame 600 can be positioned such that the second side 604 is aligned with the desired osteotomy site on the second bone 804. The frame 600 can be positioned over the target joint 810 by placing the frame 600 over the alignment blade 700. The frame 600 can be positioned by aligning at least a portion of the frame 600 with at least a portion of the second surgical instrument 1130. The position of the frame can be checked with fluoroscopy.

The frame 600 can be secured (Block 924) by coupling the frame 600 to the first bone 802, the second bone 804, the third bone 806, the fourth bone 808, the second surgical instrument 1130, etc., among other bones, devices, and/or structures that are possible, each of which is contemplated herein. The frame 600 can be coupled by inserting a k-wire through the attachment mechanism 616 and into at least one bone (e.g., the first bone 802, the second bone 804, etc.), among other coupling methods that are possible, each of which is contemplated herein.

The blade block 200 can be aligned with the frame 600 (FIG. 9B). The blade block 200 can move through the frame 600 allowing the first surface 104 to come into contact with the first bone 802 and plane and/or cut the end of the first bone 802. The blade block 200 can move through the frame 600 allowing the second surface 106 to come into contact with the second bone 804 and plane and/or cut the end of the second bone 804 (Block 926). In some embodiments, the first bone 802 and the second bone 804 can be planed and/or cut simultaneously, allowing a surgeon to perform an osteotomy with one pass of the blade block 200. In other embodiments, the second bone 804 is planed and/or cut after the first bone 802 is planed and/or cut. In certain embodiments, the first bone 802 is planed and/or cut after the second bone 804 is planed and/or cut.

FIGS. 10A through 10D illustrate another embodiment of the surgical system 100.

FIG. 10E is a schematic flow chart diagram illustration one embodiment of a method 1000 for performing an osteotomy.

The alignment blade 700 can be placed in the target joint 810 (Block 1002). In some embodiments the alignment blade 700 can be positioned perpendicular to the weight bearing surface (e.g., the transverse plane). In certain embodiments the alignment blade 700 can be positioned non-perpendicular to the weight bearing surface (e.g., the transverse plane).

The frame 600 can be positioned over the target joint 810 (Block 1004) (see, FIG. 10A). The frame 600 can be positioned such that the first side 602 is aligned with the desired osteotomy site on the first bone 802. The frame 600 can be positioned such that the second side 604 is aligned with the desired osteotomy site on the second bone 804. The frame 600 can be positioned over the target joint 810 by placing the frame 600 over the alignment blade 700. The frame 600 can be positioned by aligning at least a portion of the frame 600 with at least a portion of the second surgical instrument 1130. The position of the frame can be checked with fluoroscopy.

The frame 600 can be secured (Block 1006) by coupling the frame 600 to the first bone 802, the second bone 804, the third bone 806, the fourth bone 808, the second surgical instrument 1130, etc., among other bones, devices, and/or structures that are possible, each of which is contemplated herein. The frame 600 can be coupled by inserting a k-wire through the attachment mechanism 616 and into a bone (e.g., the first bone 802, the second bone 804, etc.), among other coupling methods that are possible, each of which is contemplated herein.

The blade block guide 500 can be positioned within the target joint 810 (FIG. 10B). In some embodiments the blade block guide 500 can be positioned perpendicular to the weight bearing surface (e.g., the transverse plane). In other embodiments the blade block guide 500 can be positioned non-perpendicular to the weight bearing surface (e.g., the transverse plane).

The blade block guide 500 can be secured (Block 1008). The blade block guide 500 can be secured by coupling the securing mechanism 506 to the first bone 802, the second bone 804, the third bone 806, the fourth bone 808, the frame 600, the second surgical instrument 1130, etc., among other bones, devices, and/or structures that are possible, each of which is contemplated herein.

The aperture(s) 114 in the blade block 200 can be aligned with the post(s) 504 of the blade block guide 500 (FIGS. 10C and 10D) (Block 1012). In some embodiments, the post 504 and the complimentary shaped aperture 114 can be shaped such that the blade block 200 can be aligned in only one configuration (e.g., a non-symmetrical shape). In other embodiments, the post 504 and the complimentary shaped aperture 114 can be shaped such that the blade block 200 can be aligned in multiple configurations (e.g., a symmetrical shape). In certain embodiments, each of the posts 504 (and thus each of the complimentary shaped apertures 114) can be a different shape such that the blade block 200 can be aligned with the posts 504 in only one configuration. In other embodiments, each of the posts 504 (and thus each of the complimentary shaped apertures 114) can be the same shape such that the blade block 200 can be aligned with the posts 504 in multiple configurations.

The blade block 200 can move over the post(s) 504 within the frame 600, allowing the first surface 104 to come into contact with the first bone 802 and plane and/or cut the first bone 802. The blade block 200 can move over the post(s)

504 of the blade block guide 500 within the frame 600, allowing the second surface 106 to come into contact with the second bone 804 and plane and/or cut the second bone 804. In some embodiments, the first bone 802 and the second bone 804 can be planed and/or cut simultaneously (FIGS. 10C and 10D), allowing a surgeon to perform an osteotomy with one pass of the body 102. In other embodiments, the second bone 804 is planed and/or cut after the first bone 802 is planed and/or cut. In certain embodiments, the first bone 802 is planed and/or cut after the second bone 804 is planed and/or cut.

Figure 12A:
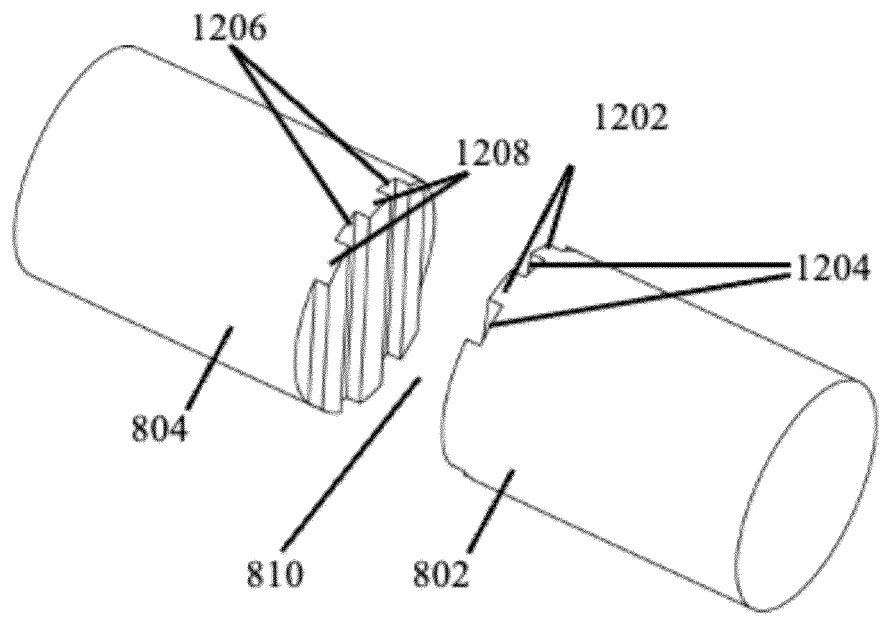
FIGS. 12A and 12B are schematic diagrams a first bone and a second bone cut with an embodiment of the surgical system.
Figure 12B:
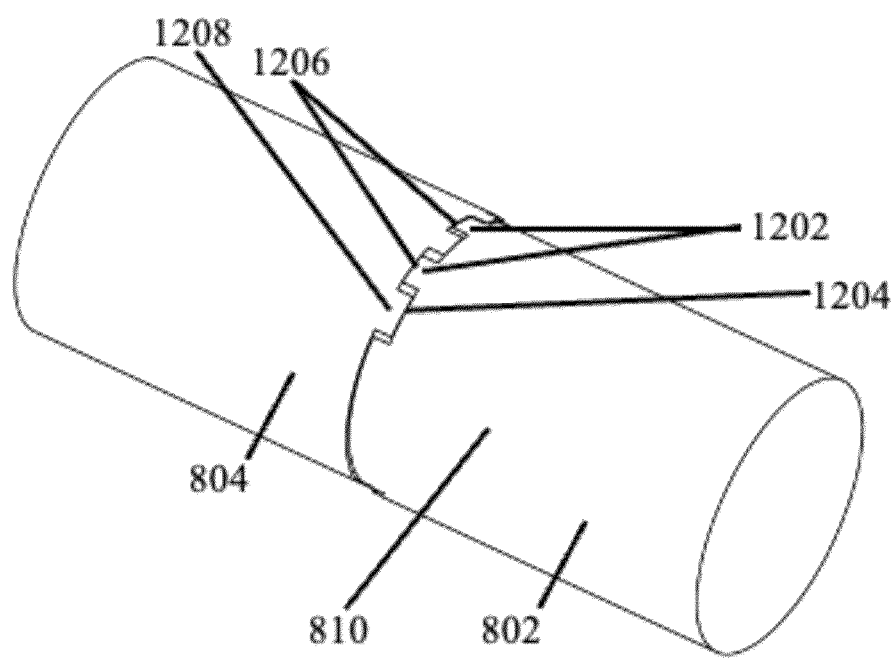

FIGS. 12A and 12B illustrate an embodiment wherein the first bone 802 and the second bone 804 have been cut by the surgical system 100 to create an interlocking end on the end of the first bone 802 of the target joint 810 and an interlocking end on the end of the second bone 804 of the target joint 810. The first bone 802 end is cut to form a first peak 1202 (or set of first peaks 1202) and a first valley 1204 (or set of first valleys 1204). The second bone 804 end is cut to form a second peak 1208 (or set of second peaks 1208) and a second valley 1206 (or set of second valleys 1206). The first peak(s) 1202 can be aligned with the second valley(s) 1206 and the first valley(s) 1204 can be aligned with the second peak(s) 1208, causing the first bone 802 end to interlock with the second bone 804 end. The forming of peak(s) and valley(s) increases the amount of surface area of the first bone 802 that can be in contact with second bone 804, which increases bone on bone contact to promote fusion and provides stability, specifically provides rotational stability, transverse stability etc., among other planes that are possible, each of which is possible and contemplated herein.

The various embodiments discussed herein may be practiced in other specific forms and the described embodiments are to be considered in all respects only as illustrative, and not restrictive. The scope of the technology is, therefore, indicated by the appended claims rather than by the foregoing description. All changes that come within the meaning and range of equivalency of the claims are to be embraced within their scope. That is, one of ordinary skill in the art will appreciate that modifications and/or adaptations to the various aspects may be made without departing from the scope of the present technology, as set forth in the following claims.

What is claimed is:

1. A surgical system, comprising:
   a body comprising:
      a first surface comprising a first plurality of cutting blades positioned on the first surface, wherein each cutting blade of the first plurality of cutting blades comprises a first blade height;
      a second surface comprising a second plurality of cutting blades positioned on the second surface, wherein:
         the second surface is opposite the first surface, and each cutting blade of the second plurality of cutting blades comprises a second blade height;
      a third surface;
      a fourth surface;
      at least one aperture that extends at least partially through the body; and
      a blade block guide comprising at least one post and configured to conform to the at least one aperture, wherein:
         the first surface, the second surface, the third surface, and the fourth surface are parallel to a reference axis, and the first surface is angled with respect to the second surface.

2. A surgical system, comprising:
   a body comprising:
      a first surface comprising a first plurality of columns of cutting blades positioned on the first surface, wherein the first plurality of columns of cutting blades comprises a first column of cutting blades and a second column of cutting blades, wherein:
         each cutting blade of the first column of cutting blades comprises a first blade height, and
         each cutting blade of the second column of cutting blades comprises a second blade height,
         the first blade height is greater than the second blade height wherein the difference between the first blade height and the second blade height is a first peak, and
         the first plurality of columns of cutting blades alternate between the first column of cutting blades and the second column of cutting blades;
      a second surface comprising a second plurality of columns of cutting blades positioned on the second surface, wherein:
         the second plurality of columns of cutting blades comprises a third column of cutting blades and a fourth column of cutting blades,
         each cutting blade of the third column of cutting blades comprises a third blade height,
         each cutting blade of the fourth column of cutting blades comprises a fourth blade height,
         the third blade height is greater than the fourth blade height wherein the difference between the third blade height and the fourth blade height is a second peak, and
         the second plurality of columns of cutting blades alternate between the third column of cutting blades and the fourth column of cutting blades;
      wherein:
         the first peak and the second peak are the same;
      a third surface;
      a fourth surface;
      wherein
         the first surface, the second surface, the third surface, and the fourth surface are parallel to a reference axis; and
         the first surface is angled with respect to the second surface;
      at least one aperture that extends at least partially through the body; and
      a blade block guide comprising at least one post and configured to conform to the at least one aperture.

3. A surgical system, comprising:
   a body comprising:
      a first surface;
      a first plurality of columns of cutting blades positioned on the first surface, wherein each of the cutting blades in the first plurality of columns are a first height;
      a second plurality of columns of cutting blades positioned on the first surface, wherein each of the cutting blades in the second plurality of columns are a second height, wherein the first height is greater than the second height.

4. The surgical system of claim 3, wherein the first plurality of columns of cutting blades and the second plurality of columns of cutting blades are positioned on the first surface in an alternating pattern.

5. The surgical system of claim 3, wherein the body further comprises:
a second surface;
a third plurality of columns of cutting blades positioned on the second surface, wherein each of the cutting blades in the third plurality of columns are a third height; and
a fourth plurality of columns of cutting blades positioned on the second surface, wherein each of the cutting blades in the fourth plurality of columns are a fourth height, wherein the third height is greater than the fourth height.

6. The surgical system of claim 5, wherein the third plurality of columns of cutting blades and the fourth plurality of columns of cutting blades are positioned on the second surface in an alternating pattern.

7. The surgical system of claim 6, further comprising an attachment mechanism configured to couple the body to a reciprocating saw.

8. The surgical system of claim 6, wherein the first surface is angled at a first angle relative to the second surface, and the first angle is in the range of 0 degrees to 45 degrees.

9. The surgical system of claim 8, wherein the first angle is zero, such that the first surface is parallel to the second surface.

10. The surgical system of claim 9, wherein the first surface and the second surface are parallel to a reference axis between the first surface and the second surface.

11. The surgical system of claim 6, wherein the first height and the third height are the same.

12. The surgical system of claim 11, wherein the second height and the fourth height are the same.

13. The surgical system of claim 12, wherein the first plurality of columns and the fourth plurality of columns are aligned on opposing surfaces and the second plurality of columns and the third plurality of columns are aligned on opposing surfaces.

14. The surgical system of claim 6, further comprising at least one aperture that extends at least partially through the body, wherein the at least one alignment aperture is configured to receive a blade block guide.

15. The surgical system of claim 14, wherein the blade block guide comprises a plurality of posts and a base, wherein each of the plurality of posts is configured to conform with the at least one alignment aperture such that the body can slide over the blade block guide.

16. The surgical system of claim 15, further comprising a securing mechanism, wherein the securing mechanism includes an aperture configured to receive a pin to secure the blade block guide to a secondary structure.

17. The surgical system of claim 16, wherein the secondary structure is a bone.

18. The surgical system of claim 16, wherein the secondary structure is a second surgical device.

* * * * *